(12) United States Patent
Lin et al.

(10) Patent No.: US 9,607,388 B2
(45) Date of Patent: Mar. 28, 2017

(54) SYSTEM AND METHOD OF POSE ESTIMATION

(71) Applicant: QUALCOMM Incorporated, San Diego, CA (US)

(72) Inventors: Kuen-Han Lin, San Diego, CA (US); Sairam Sundaresan, San Diego, CA (US); Michel Adib Sarkis, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 255 days.

(21) Appl. No.: 14/491,857

(22) Filed: Sep. 19, 2014

(65) Prior Publication Data

US 2016/0086336 A1 Mar. 24, 2016

(51) Int. Cl.
*H04N 13/00* (2006.01)
*G06T 7/00* (2017.01)
*H04N 13/02* (2006.01)
*G06T 7/73* (2017.01)

(52) U.S. Cl.
CPC ........... *G06T 7/0044* (2013.01); *G06T 7/74* (2017.01); *H04N 13/0221* (2013.01); *H04N 13/0282* (2013.01); *G06T 2200/04* (2013.01); *G06T 2207/10016* (2013.01); *G06T 2207/30244* (2013.01)

(58) Field of Classification Search
IPC .................................................... G06T 7/0044
See application file for complete search history.

(56) References Cited

U.S. PATENT DOCUMENTS

| 6,101,272 | A  | 8/2000  | Noguchi          |
| 6,281,904 | B1 | 8/2001  | Reinhardt et al. |
| 6,297,825 | B1 | 10/2001 | Madden et al.    |
| 6,469,710 | B1 | 10/2002 | Shum et al.      |
| 6,476,803 | B1 | 11/2002 | Zhang et al.     |

(Continued)

FOREIGN PATENT DOCUMENTS

| CN | 102364953 A    | 2/2012 |              |
| EP | 1022654 A2  *  | 7/2000 | ... G06F 8/10 |

(Continued)

OTHER PUBLICATIONS

"Artec Studio 9 User Guide v 9.2," Retrieved from <<http://artec-group.com/sw/ug/ug.pdf>>, Jun. 5, 2014, ARTEC Group, Luxembourg, 135 pages.

(Continued)

*Primary Examiner* — Tracy Y Li
(74) *Attorney, Agent, or Firm* — Toler Law Group, PC

(57) ABSTRACT

A method includes receiving, from an image capture device, a first image frame of a sequence of image frames. The method also includes estimating, at a processor, a camera pose corresponding to the first image frame by comparing the first image frame to a second image frame. The second image frame precedes the first image frame in the sequence of image frames. The method further includes estimating, at the processor, a refined camera pose corresponding to the first image frame by comparing the first image frame to a keyframe. The keyframe corresponds to a particular image frame that precedes the second image frame in the sequence of image frames.

30 Claims, 12 Drawing Sheets

(56) References Cited

U.S. PATENT DOCUMENTS

| | | | |
|---|---|---|---|
| 6,487,304 B1* | 11/2002 | Szeliski | G06K 9/20 |
| | | | 382/107 |
| 6,750,873 B1 | 6/2004 | Bernardini et al. | |
| 8,036,441 B2 | 10/2011 | Frank et al. | |
| 8,149,268 B1 | 4/2012 | Meyers et al. | |
| 8,326,035 B2 | 12/2012 | Ubillos et al. | |
| 8,471,890 B1* | 6/2013 | Golas | H04N 7/15 |
| | | | 348/14.08 |
| 8,587,583 B2 | 11/2013 | Newcombe et al. | |
| 2003/0001837 A1 | 1/2003 | Baumberg | |
| 2004/0189686 A1 | 9/2004 | Tanguay et al. | |
| 2005/0057561 A1 | 3/2005 | El-Din Elshishiny et al. | |
| 2005/0140670 A1 | 6/2005 | Wu et al. | |
| 2005/0285872 A1 | 12/2005 | Wang et al. | |
| 2010/0074532 A1 | 3/2010 | Gordon et al. | |
| 2010/0223032 A1 | 9/2010 | Reghetti et al. | |
| 2011/0187820 A1 | 8/2011 | Gilboa et al. | |
| 2012/0177269 A1 | 7/2012 | Lu et al. | |
| 2012/0182392 A1 | 7/2012 | Kearns et al. | |
| 2012/0300020 A1* | 11/2012 | Arth | G06T 7/0046 |
| | | | 348/36 |
| 2013/0004060 A1 | 1/2013 | Bell et al. | |
| 2013/0100119 A1 | 4/2013 | Evertt et al. | |
| 2013/0136341 A1 | 5/2013 | Yamamoto | |
| 2013/0148851 A1* | 6/2013 | Leung | G06K 9/3241 |
| | | | 382/103 |
| 2013/0272570 A1 | 10/2013 | Sheng et al. | |
| 2013/0286161 A1 | 10/2013 | Lv et al. | |
| 2013/0314501 A1 | 11/2013 | Davidson et al. | |
| 2013/0322767 A1 | 12/2013 | Chao et al. | |
| 2013/0336589 A1* | 12/2013 | Takahashi | G06T 9/00 |
| | | | 382/215 |
| 2014/0002597 A1 | 1/2014 | Taguchi et al. | |
| 2014/0037140 A1* | 2/2014 | Benhimane | G06K 9/6211 |
| | | | 382/103 |
| 2014/0132715 A1 | 5/2014 | Raghoebardayal et al. | |
| 2014/0168262 A1 | 6/2014 | Forutanpour et al. | |
| 2014/0210947 A1 | 7/2014 | Finn et al. | |
| 2014/0225985 A1* | 8/2014 | Klusza | H04N 13/0207 |
| | | | 348/43 |
| 2014/0267618 A1 | 9/2014 | Esteban et al. | |
| 2014/0321702 A1* | 10/2014 | Schmalstieg | G06K 9/00624 |
| | | | 382/103 |
| 2015/0049083 A1 | 2/2015 | Bidne et al. | |
| 2015/0098645 A1 | 4/2015 | Leung | |
| 2015/0178988 A1 | 6/2015 | Montserrat et al. | |
| 2015/0187140 A1 | 7/2015 | Tseng et al. | |
| 2015/0302601 A1 | 10/2015 | Rivet-Sabourin | |
| 2016/0005211 A1 | 1/2016 | Sarkis | |
| 2016/0171767 A1 | 6/2016 | Anderson | |
| 2016/0232715 A1 | 8/2016 | Lee | |
| 2016/0335782 A1 | 11/2016 | Sundaresan et al. | |
| 2016/0335792 A1 | 11/2016 | Forutanpour et al. | |
| 2016/0335809 A1 | 11/2016 | Forutanpour et al. | |

FOREIGN PATENT DOCUMENTS

| | | |
|---|---|---|
| EP | 2545411 B1 | 2/2014 |
| JP | 2010020487 | 1/2010 |
| WO | 9926198 A2 | 5/1999 |
| WO | 2013165440 A1 | 11/2013 |

OTHER PUBLICATIONS

Baumberg, A., "Blending images for texturing 3D models", Proc. Conf. on British Machine Vision Association, 2002, British Machine Vision Association, Durham, England, pp. 404-413.

Du, H., et al., "Interactive 3D Modeling of Indoor Environments with a Consumer Depth Camera," Proceedings of the 13th International Conference on Ubiquitous Computing, Sep. 17, 2011, pp. 75-84.

Grammatikopoulos, L., et al., "Automatic Multi-View Texture Mapping of 3d Surface Projections," Proceedings of the 2nd ISPRS International Workshop 3D-ARCH, 2007, International Society for Photogrammetry and remote Sensing, International Council for Science, Paris, 6 Pages.

Ha, J., et al., "Real-time Scalable Recognition and Tracking based on the Server-client Model for Mobile Augmented Reality," VR Innovation (ISVRI), 2011 IEEE International Symposium on, Mar. 19, 2011, IEEE Piscataway NJ, pp. 267-272.

Herrera, C. D., et al., "Joint Depth and Color Camera Calibration with Distortion Correction," IEEE Transactions on Pattern Analysis and Machine Intelligence, May 29, 2012, vol. 34, Issue 10, IEEE, Piscataway, New Jersey, pp. 2058-2064.

Huo, J-Y., et al., "Robust Automatic White Balance Algorithm using Gray Color Points in Images" IEEE Transactions on Consumer Electronics, May 2005, vol. 52, Issue 2, IEEE, Piscataway, New Jersey, pp. 541-546.

International Search Report and Written Opinion for International Application No. PCT/US2015/038582, ISA/EPO, Date of Mailing Oct. 1, 2015, 14 pages.

Khalfaoui, S., et al., "Fully Automatic 3D Digitization of unknown Objects using Progressive Data Bounding Box," Proceedings of SPIE, Three-Dimensional Image Processing (3DIP) and Applications II, Jan. 30, 2012, vol. 8290, SPIE, Bellingham, Washington, 8 pages.

Lempitsky, V., et al., "Seamless Mosaicing of Image-Based Texture Maps", 2007 IEEE Conference on Computer Vision and Pattern Recognition, Jun. 2007, IEEE, Piscataway, New Jersey, pp. 1-6.

Li, M. et al., "3-D Motion Estimation and Online Temporal Calibration for Camera-IMU Systems," 2013 IEEE International Conference on Robotics and Automation (ICRA), May 2013, IEEE, Piscataway, NJ, pp. 5709-5716.

Pighin, F., et al., "Synthesizing Realistic Facial Expressions from Photographs," SIGGRAPH '98, Jul. 1998, Association for Computing Machinery, Inc., New York, NY, pp. 75-84.

Shinozaki, M., et al., "Correction of Color Information of a 3D Model using a Range Intensity Image," Computer Vision and Image Understanding, 2009, vol. 113, Elsevier, Amsterdam, Netherlands, pp. 1170-1179.

Vacchetti, L., et al., "Fusing Online and Offline Information for Stable 3D Tracking in Real-time," Proceedings of the IEEE Computer Conference on Computer Vision and Pattern Recognition, Jun. 2003, vol. 2, Piscataway, New Jersey, pp. 241-248.

Zhang, D., et al., "Photorealistic 3D Volumetric Model Reconstruction by Voxel Coloring," International Archives of Photogrammetry and Remote Sensing, Sep. 2010, vol. XXXVIII, Part 3B, pp. 92-97.

Benhimane S., et al., "Real-Time Image-Based Tracking of Planes using Efficient Second-Order Minimization," Intelligent Robots and Systems (IROS 2004), Proceedings of IEEE/RSJ International Conference on, 2004, vol. 1, pp. 943-948.

Berger K., et al., "A State of the Art Report on Kinect Sensor Setups in Computer Vision," Time-of-Flight and Depth Imaging Sensors, Algorithms, and Applications, Lecture Notes in Computer Science, 2013, vol. 8200, pp. 257-272.

"Dense Visual Slam," Technical University of Munich, Retrieved date Jan. 5, 2014, Retrieved from the Internet < URL: http://vision.in.tum.de/data/software/dvo >, 4 pages.

Gorman M, "Lynx A 3D point-and-shoot camera/tablet does motion capture and 3D modeling, we go hands-on," Apr. 17, 2013, 3 pages.

Kerl C., et al., "Dense Visual SLAM for RGB-D Cameras," Proceedings of IEEE/RSJ International Conference on Intelligent Robots and Systems (IROS), 2013, pp. 2100-2106.

Kerl C., et al., "Robust Odometry Estimation for RGB-D Cameras," IEEE International Conference on Robotics and Automation (ICRA), 2013, pp. 3748-3754.

Kim S., et al., "Relocalization Using Virtual Keyframes for Online Environment Map Construction," Proceedings of the 16th ACM Symposium on Virtual Reality Software and Technology (VRST), Nov. 2009, pp. 127-134.

Klein G., et al., "Parallel Tracking and Mapping for Small AR Workspaces," 6th IEEE and ACM International Symposium on Mixed and Augmented Reality, 2007. ISMAR 2007. pp. 225-234.

Whelan T., et al., "Robust Real-Time Visual Odometry for Dense RGB-D Mapping," IEEE International Conference on Robotics and Automation (ICRA), 2013, pp. 5724-5731.

(56) References Cited

OTHER PUBLICATIONS

Alshawabkeh Y., et al., "Automatic Multi-Image Photo-Texturing of Complex 3D Scenes," International Symposium CIPA 2005, Sep. 26, 2005 (Sep. 26, 2005), pp. 1-6, XP007914583, section 3.3 Summary of the Overall Procedure.

Cooper T., et al., "Novel Approach to Color Cast Detection and Removal in Digital Images", Optomechatronic Micro/Nano Devices and Components III : Oct. 8-10, 2007, Lausanne, Switzerland, [Proceedings of SPIE , ISSN 0277-786X], Spie, Bellingham, Wash, vol. 3963, 2000, pp. 167-177, XP002471492, DOI: 10.1117/12.373394 ISBN: 978-1-62841-730-2 the whole document.

Gasparini F., et al., "Color Balancing of Digital Photos Using Simple Image Statistics", Pattern Recognition, Elsevier, GB, vol. 37, No. 6, Jun. 2004 (Jun. 2004), pp. 1201-1217, XP004505321, ISSN: 0031-3203, DOI: 10.1016/J. PATCOG.2003.12.007 the whole document.

International Search Report and Written Opinion—PCT/US2016/020474—ISA/EPO—Jun. 8, 2016.

Neugebauer P.J., et al., "Texturing 3D Models of real World Objects from Multiple Unregistered Photographic Views," Computer Graphics Forum, Wiley-Blackwell Publishing Ltd, GB, vol. 18, No. 3, Sep. 7, 1999 (Sep. 7, 1999), p. C245, XP001034480, ISSN: 0167-7055, DOI: 10.1111/1467-8659.00345.

Niem W., et al., "Automatic Reconstruction of 3D Objects using a Mobile Camera," Image and Vision Computing, Elsevier, Guildford, GB, vol. 17, No. 2, Feb. 1999 (Feb. 1999), pp. 125-134, XP002258790, ISSN: 0262-8856, DOI: 10.1016/S0262-8856(98)00116-4 p. 131.

Ofek E., et al., "Multiresolution Textures from Image Sequences," IEEE Computer Graphics and Applications, IEEE Service Center, New York, NY, US, vol. 17, No. 2, Mar. 1997 (Mar. 1997), pp. 18-29, XP000927819, ISSN: 0272-1716, DOI: 10.1109/38.574667 pp. 20,21.

Pulli K., et al., "Acquisition and Visualization of Colored 3D Objects," Pattern Recognition, 1998, Proceedings. Fourteenth International Conference on Brisbane, QLD., Australia Aug. 16-20, 1998, Los Alamitos, CA, USA,IEEE Computer Society, US, vol. 1, Aug. 16, 1998 (Aug. 16, 1998), pp. 11-15, XP010297445, DOI: 10.1109/ICPR.1998.711067 ISBN: 978-0-8186-8512-5.

Rohs M., "Marker-Based Embodied Interaction for Handheld Augmented Reality Games", JVRB Journal of Virtual Reality and Broadcasting, Feb. 6, 2007, Retrieved from Internet on Oct. 24, 2016, https://www.jvrb.org/pastissues/4.2007/793, pp. 1-15.

Weng C-C., et al., "A Novel Automatic White Balance Method for Digital Still Cameras", Conference Proceedings / IEEE International Symposium on Circuits and Systems (ISCAS) : May 23-26, 2005, International Conference Center, Kobe, Japan, IEEE Service Center, Piscataway, NJ, May 23, 2005 (May 23, 2005), pp. 3801-3804, XP010816492, DOI: 10.1109/ISCAS.2005.1465458 ISBN: 978-0-7803-8834-5 section III.

* cited by examiner

SYSTEM AND METHOD OF POSE ESTIMATION

I. FIELD

The present disclosure is generally related to a system and method of pose estimation.

II. DESCRIPTION OF RELATED ART

Advances in technology have resulted in smaller and more powerful computing devices. For example, there currently exist a variety of portable personal computing devices, including wireless telephones such as mobile and smart phones, tablets and laptop computers that are small, lightweight, and easily carried by users. These devices can communicate voice and data packets over wireless networks. Further, many such devices incorporate additional functionality such as a digital still camera, a digital video camera, a digital recorder, and an audio file player. Also, such devices can process executable instructions, including software applications, such as a web browser application, that can be used to access the Internet. As such, these devices can include significant computing capabilities.

Wireless telephones and similar devices may be used to capture images. Such images may be used to generate a three-dimensional (3D) model of an object. Generally, devices for generating 3D models do not operate in real time or near real time. Rather, a sequence of image frames is captured (e.g., by a camera), and the sequence of image frames is subsequently processed as a group (e.g., at a processing system, such as a computer) to generate the 3D model. If the sequence of image frames is insufficient or inadequate to generate a complete 3D model, such insufficiency or inadequacy may go unnoticed until after the processing to generate the 3D model. In this case, an incomplete or inaccurate 3D model may be generated. To generate a more complete or more accurate 3D model, the user may have to capture a new sequence of images of the object and process the new sequence of images.

III. SUMMARY

A system and method is disclosed that enables real time or near real time generation of a 3D point cloud and/or a 3D model based on a captured sequence of image frames. The sequence of image frames may be captured by an image capture device (e.g., a camera of a mobile phone). A user (e.g., an operator) of the image capture device may move the image capture device around an object to capture the sequence of image frames of the object.

The 3D point cloud and/or the 3D model may be generated at an electronic device (e.g., a mobile phone that includes the camera) by utilizing parallel processing threads to process a sequence of image frames. For example, a first processing thread and a second processing thread may be processed in parallel to enable real time or near real time processing of the image frames. For example, the first processing thread may perform camera pose estimation from frame-to-frame, and the second processing thread may perform camera pose estimation from frame-to-keyframe.

In a particular embodiment, the first processing thread and the second processing thread may process images with different resolutions. For example, the first processing thread may process low resolution (e.g., Quarter-Quarter Video Graphics Array (QQVGA) resolution) image frames to estimate camera poses of one or more image frames. The second processing thread may process higher resolution (e.g., Quarter Video Graphics Array (QVGA) resolution) image frames and reference image frames (i.e., keyframes) to refine the camera pose of a particular image frame. For example, the camera pose may be refined by comparing a QVGA image frame to a particular keyframe to determine additional information that may be lost when the QVGA image frame is down-sampled to QQVGA resolution. The particular keyframe may be one of a plurality of keyframes and each of the plurality of keyframes may serve as a reference image frame at a corresponding location relative to the object. While the sequence of image frames is being captured, one or more additional keyframes are generated to refine camera pose estimates to generate the 3D point cloud and/or 3D model. The additional keyframes may serve as additional reference image frames to compare against the sequence of image frames at different locations relative to the object.

In a particular embodiment, a method includes receiving, from an image capture device (e.g., a camera), a first image frame of a sequence of image frames. The method also includes estimating, at a processor, a camera pose corresponding to the first image frame by comparing the first image frame to a second image frame, where the second image frame precedes the first image frame in the sequence of image frames. The method further includes estimating, at the processor, a refined camera pose corresponding to the first image frame by comparing the first image frame to a keyframe, where the keyframe corresponds to a particular image frame that precedes the second image frame in the sequence of image frames.

In another particular embodiment, an apparatus includes a memory and a processor. The processor is configured to receive, from an image capture device, a first image frame of a sequence of image frames. The processor is also configured to estimate a camera pose corresponding to the first image frame by comparing the first image frame to a second image frame, where the second image frame precedes the first image frame in the sequence of image frames. The processor is further configured to estimate a refined camera pose corresponding to the first image frame by comparing the first image frame to a keyframe, where the keyframe corresponds to a particular image frame that precedes the second image frame in the sequence of image frames.

In another particular embodiment, a computer-readable storage device includes instructions that, when executed by a processor, cause the processor to receive, from an image capture device, a first image frame of a sequence of image frames. The instructions also cause the processor to estimate a camera pose corresponding to the first image frame by comparing the first image frame to a second image frame, where the second image frame precedes the first image frame in the sequence of image frames. The instructions further cause the processor to estimate a refined camera pose corresponding to the first image frame by comparing the first image frame to a keyframe, where the keyframe corresponds to a particular image frame that precedes the second image frame in the sequence of image frames.

In yet another particular embodiment, an apparatus includes means for receiving, from an image capture device, a first image frame of a sequence of image frames. The apparatus also includes means for estimating a camera pose corresponding to the first image frame based on a first comparison of the first image frame to a second image frame, where the second image frame precedes the first image frame in the sequence of image frames. The apparatus further includes means for estimating a refined camera pose corresponding to the first image frame based on a second comparison of the first image frame to a keyframe, where the keyframe corresponds to a particular image frame that precedes the second image frame in the sequence of image frames.

One particular advantage provided by at least one of the disclosed embodiments is that estimation of a camera pose based on a comparison between adjacent image frames in a sequence of image frames and estimation of a refined camera pose based on a comparison between a particular image frame and a keyframe may be performed concurrently (e.g., in parallel) using separate processing threads. Parallel processing of camera pose estimation and camera pose refinement enables real time or near real time processing of the sequence of image frames to generate a 3D point cloud or a 3D model. Another particular advantage provided by at least one of the disclosed embodiments is an ability to generate a 3D point cloud of an object in real time or near real time with respect to the capturing of image frames of the object.

Other aspects, advantages, and features of the present disclosure will become apparent after review of the entire application, including the following sections: Brief Description of the Drawings, Detailed Description, and the Claims.

IV. BRIEF DESCRIPTION OF THE DRAWINGS

V. DETAILED DESCRIPTION

Figure 1:
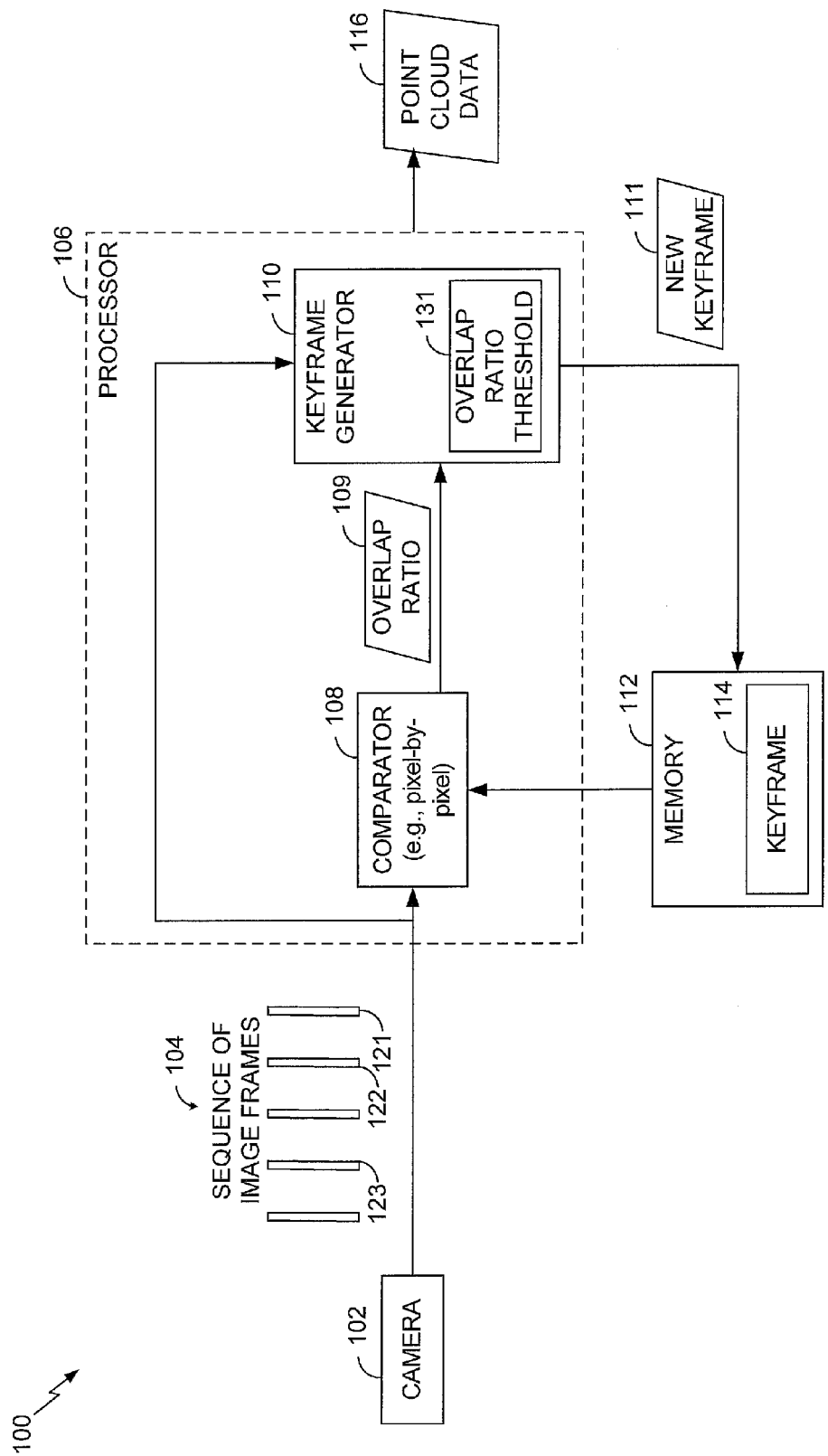
FIG. 1 is a block diagram of a particular illustrative embodiment of a system to generate point cloud data based on a sequence of image frames.

Referring to FIG. 1, a particular illustrative embodiment of a system 100 is shown. The system 100 includes a camera 102 communicatively coupled to a processor 106 and a memory 112. In an illustrative embodiment, the camera 102, the processor 106, and the memory 112 may be integrated into a computing or electronic device, such as a mobile phone, a tablet computer, a personal computer, a media player device, etc.

In a particular embodiment, the system 100 is configured to generate point cloud data 116 (e.g., a 3D point cloud or a 3D model) during an image capture process as an image capture device (e.g., the camera 102) is moved around an object. The camera 102 (or another image capture device) may be configured to capture a sequence of image frames 104. The camera 102 may be moved around the object (e.g., by a user that may walk around the object) while the camera 102 captures the sequence of image frames 104. In the embodiment shown, the sequence of image frames 104 includes five image frames; however, the sequence of image frames 104 may include more than five image frames or fewer than five image frames. Each image frame includes multiple pixels, and each pixel corresponds to a set of pixel values, such as depth values, photometric values (e.g., red-green-blue (RGB) values, intensity values, chroma values, saturation values, etc.), or a combination thereof.

The camera 102 may provide the sequence of image frames 104 to a comparator 108 of the processor 106. In a particular embodiment, the processor 106 may be a single core processor. In another embodiment, the processor 106 may include multiple processing cores, and the comparator 108 may correspond to (e.g., be executed by) at least one core of the multiple processing cores. In another particular embodiment, the processor 106 may include multiple processors operating in parallel, where each processor of the multiple processors includes a corresponding comparator, such as the comparator 108. In an illustrative embodiment, each image frame in the sequence of image frames 104 may be captured at a source resolution (e.g., a high resolution, such as high definition (HD)).

Although not illustrated, one or more image frames of the sequence of image frames 104 may be buffered (e.g., stored) by the processor 106. For example, the processor 106 may receive a particular image frame of the sequence of image frames 104 at a source resolution (e.g., a high resolution, such as high definition (HD)) and may store the image frame at the source resolution at a memory, such as a random access memory (RAM) coupled to or included in the processor 106. Additionally or alternatively, the processor 106 may be configured to down sample or resize one or more image frames of the sequence of image frames 104. For example, the processor 106 may generate one or more reduced resolution image frames (as compared to the source resolution) of the particular image frame. To illustrate, when the source resolution is the high resolution (e.g., HD resolution), the processor 106 may generate a medium resolution (e.g., Quarter Video Graphics Array (QVGA) resolution) image frame and/or a low resolution (e.g., Quarter-Quarter Video Graphics Array (QQVGA) resolution) image frame of the particular image frame. In some implementations, the processor 106 may receive the particular image frame at various (e.g., different) resolutions. The processor 106 may be configured to store (e.g., buffer) the one or more reduced resolution image frames of the particular image frame at the memory (e.g., the RAM) that is included in or coupled to the processor 106. The image frames at various resolutions that are buffered at or by the processor 106 may be accessible to one or more components of the processor 106, such as the comparator 108 and/or the keyframe generator 110. One or more reduced resolution versions of the particular image frame may be generated in response to the processor 106 receiving the particular image frame or may be generated on an as needed basis as the one or more reduced resolution versions of the particular image frame are needed (e.g., requested) by components of the processor 106.

The comparator 108 may be implemented using one or more hardware devices (e.g., a logic circuit) of the processor 106, software instructions (e.g., program code) executable by the processor 106, or a combination thereof. In a particular embodiment, the comparator 108 is configured to perform a pixel-by-pixel comparison of image frames in the sequence of image frames 104 with respect to each other and/or with respect to one or more keyframes 114 stored in the memory 112. In a particular embodiment, the comparator 108 performs the pixel-by-pixel comparison to determine an overlap ratio 109, as described further below. The pixel-by-pixel comparison may include a comparison between pixel values (e.g., depth values, photometric values (e.g., red-green-blue (RGB) values), or a combination thereof) of the first image frame 121 and pixel values of the second image frame 122 or the keyframe 114.

The overlap ratio 109 may be a numerical representation of similarity of two or more image frames of the sequence of image frames 104. For example, the numerical representation may be a number of "similar" pixels divided by a total number of pixels. Pixels of two or more image frames may be determined to be similar when the pixels exactly match (e.g., have the same numeric value for a particular pixel value) or when the pixels substantially match (e.g., the numerical value of a first pixel is within a difference threshold of a corresponding numerical value of a second pixel). In an alternative embodiment, the overlap ratio 109 may be a numerical representation of dissimilarity between two or more image frames of the sequence of image frames 104. For example, the overlap ratio 109 may be a number of "dissimilar" pixels (e.g., pixels that are not similar as described above) divided by the total number of pixels. In a particular embodiment, determining the overlap ratio 109 includes determining multiple difference values between an image frame and a keyframe based on a pixel-by-pixel comparison and determining a number of the multiple difference values that satisfy a difference threshold (which may correspond to the overlap ratio threshold 131), where the overlap ratio 109 is based on the number divided by a total number of pixels of the image frame.

The keyframe generator 110 may generate a new keyframe 111 based on an initially captured frame (e.g., a first image frame 121) of the sequence of image frames 104. For example, when no keyframes 114 associated with the sequence of image frames 104 are stored to the memory 112, then the first image frame 121 (or a version thereof) may be used as a new keyframe 111 by default. A particular generated keyframe may be stored as one of the keyframes 114 and may have the same resolution as a captured image frame or may have a different resolution than the captured image frame (e.g., the keyframe 111 generated based on the first image frame 121 may have a different resolution than the first image frame 121). For example, the particular keyframe may be a medium resolution (e.g., Quarter Video Graphics Array (QVGA) resolution) image frame that retains at least some detail from the first image frame 121 while using a lower memory or processing footprint than the first image frame 121 at a source resolution (e.g., the first image frame's 121 original resolution). In a particular embodiment, the processor 106 (e.g., the keyframe generator 110) may be configured to down-sample or resize the first image frame 121 to generate the new keyframe 111.

Additionally or alternatively, the keyframe generator 110 may generate the new keyframe 11 based on a particular keyframe of the one or more keyframes 114 and a captured image (e.g., the second image 122) of the sequence of image frames 104. To illustrate, each of the one or more keyframes 114 may be available to serve as a reference image frame for one more of image frames of the sequence of image frames 104 (e.g., to refine camera pose estimates, as described below). For example, the comparator 108 may be used to compare a particular keyframe (that is based on the first image frame 121) of the one or more keyframes 114 to a second image frame 122 to refine a camera pose associated with the second image frame 122. As additional image frames of the sequence of image frames 104 are received, the comparator 108 may perform a pixel-by-pixel comparison of each received image frame, or reduced resolution versions thereof, to a previously stored keyframe of the one or more keyframes 114 in the memory 112. In a particular embodiment, the pixel-by-pixel comparison determines pixels of the second image frame 122 that are similar to a corresponding pixel of the particular keyframe. The comparator 108 may calculate the overlap ratio 109 based on the number of similar pixels. For example, the comparator 108 may generate the overlap ratio 109 based on the number of similar pixels between the second image frame 122 and the particular keyframe divided by a total number of pixels in the second image frame 122. In an alternative embodiment, the overlap ratio 109 may be a numerical representation of a number of dissimilar pixels between the first image frame 121 and the second image frame 122 divided by a number of total pixels. The second image frame 122 may also be modified (e.g., warped or distorted as described with reference to FIG. 6), to align to the first image frame 121 to calculate the overlap ratio 109.

The keyframe generator 110 may be configured to compare the overlap ratio 109 to an overlap ratio threshold 131. The overlap ratio threshold 131 may be expressed in terms of a percentage, a number of pixels, or in some other fashion. For example, the overlap ratio threshold 131 may be a percentage when the overlap ratio 109 is expressed as a percentage. In a particular embodiment, the overlap ratio 109 is a percentage of similar pixels of a total number of pixels, and the overlap ratio threshold 131 is a percentage at or above which an image frame is considered to be substantially similar (e.g., 90% similarity) to a keyframe. A value of the overlap ratio threshold 131 may be adjusted (e.g., by a user) to increase or decrease sensitivity in determining whether image frames are substantially similar. In a particular embodiment, the overlap ratio 109 may satisfy the overlap ratio threshold 131 when the overlap ratio 109 is greater than or equal to the overlap ratio threshold 131. When the overlap ratio 109 is greater than or equal to the overlap ratio threshold 131, the image frame and the keyframe are substantially similar and the keyframe generator 110 does not generate the new keyframe 111 (e.g., another keyframe) for storage in the memory 112. In another particular embodiment, the overlap ratio 109 may satisfy the overlap ratio threshold 131 when the overlap ratio 109 is less than or equal to the overlap ratio threshold 131. When the overlap ratio 109 is less than or equal to the overlap ratio threshold 131, the image frame and the keyframe are not substantially similar and the keyframe generator 110 generates a new keyframe 111 (e.g., another keyframe) for storage in the memory 112. Generating the new keyframe 111 may include creating a copy of a source frame of the sequence of image frames 104. In a particular embodiment, the copy has a reduced resolution (e.g., QVGA resolution) relative to the source frame (e.g., HD resolution).

In a particular embodiment, when the comparison of the overlap ratio 109 to the overlap ratio threshold 131 indicates that the image frame and the keyframe are not substantially similar, a substantial change is determined to have occurred between a first position and a second position of the camera 102, such as a first position of the camera 102 during capture of the first image frame 121 and a second position of the camera 102 during capture of the second image frame 122. Thus, based on the comparison between the overlap ratio 109 and the overlap ratio threshold 131, the first image frame 121 and the second image frame 122 may be determined to be substantially different image frames having different image data. When the first image frame 121 and the second image frame 122 are determined to be substantially different image frames, the keyframe generator 110 may generate a new keyframe 111 based on the second image frame 122. Alternatively, when the comparison of the overlap ratio 109 to the overlap ratio threshold 131 indicates that the image frame and the keyframe are substantially similar, no new keyframe 111 is generated based on the second image frame 122 because the keyframe 114 and the second image frame 122 include substantially the same image data. When the keyframe 114 and the second image frame 122 are substantially similar, generation of a new keyframe 111 is not needed. By reducing the number of new keyframes generated and available for comparisons, the sequence of image frames 104 may be processed in a more efficient manner.

Generally, not every image frame of the sequence of image frames 104 will be determined to be similar to the keyframe based on the overlap ratio threshold 131. When a particular image frame, such as a fourth image frame 123, is captured and provided to the comparator 108, the camera 102 may be in a substantially different position from when an image frame corresponding to a particular keyframe (e.g., the particular keyframe based on the first image frame 121) of the one or more keyframes 114 was captured. As a result, the overlap ratio 109 corresponding to a comparison between the particular keyframe and the fourth image frame 123 may be determined and may be compared to the overlap ratio threshold 131 to indicate whether the fourth image frame 123 and the particular keyframe are similar. Thus, a new keyframe 111 based on the fourth image frame 123 may be generated and stored in the memory 112 when the fourth image frame 123 and the particular keyframe are determined to not be similar, based on the comparison. When the new keyframe 111 is generated based on the fourth image frame 123, received image frames that follow the fourth image frame 123 of the sequence of image frames 104 may be used by the comparator 108 to perform additional pixel-by-pixel comparisons of such image frames (or of reduced resolution versions of such image frames) to the new keyframe 111 generated based on the fourth image frame 123. Thus, after an initial received image frame in a sequence of image frames 104 is designated as a keyframe and stored in the memory 112, comparisons performed by the comparator 108 are performed with respect to a "most recently generated" keyframe in the memory 112 (e.g., the last generated keyframe based on timestamps of the keyframes 114). Alternately, comparisons may be performed by the comparator 108 with respect to a set of previously generated keyframes in the memory 112. For example, the memory 112 may store keyframe(s) that were previously generated during processing of the sequence of image frames 104. In some embodiments, one of the previous keyframes may be selected to be used in the comparison performed by the comparator 108, as further described with reference to FIG. 2.

In a particular embodiment, the new keyframe 111 is generated at a reduced resolution relative to image frames of the sequence of image frames 104. A reduced resolution image frame may be generated from an image frame via down-sampling, resizing, and/or other operations. For example, if the second image frame 122 is a HD image frame, the new keyframe 111 may be a medium resolution image frame (e.g., QVGA resolution, e.g., 320×240 pixels). The keyframe generator 110 may send newly generated keyframes, e.g. the new keyframe 111, to the memory 112. In a particular embodiment, the memory 112 may include random access memory (RAM), read-only memory (ROM), disk-based memory, solid state memory, or any combination thereof. In the embodiment shown in FIG. 1, the new keyframe 111 may be stored as one of the keyframe(s) 114 within the memory 112. One or more keyframes 114 associated with the sequence of image frames 104 may be stored in the memory 112 during operation of the camera 102. In a particular embodiment, a number of the multiple keyframes 114 is fewer than a total number of image frames in the sequence of image frames 104. The multiple keyframes 114 may provide multiple reference image frames to refine camera poses from different relative positions around the scene. In a particular embodiment, each of the keyframes 114 in the memory 112 is available to be selected and used in a comparison by the comparator 108 as a reference image frame. For example, in some implementations, the memory 112 may include multiple keyframes 114 and a most similar keyframe of the stored multiple keyframes 114 may be selected to be used in a comparison with a particular image frame of the sequence of image frames 104, as described further herein with reference to FIG. 2. Additionally or alternatively, the one or more keyframes 114 stored in the memory 112 and corresponding to the set of sequence of image frames 104 may include each keyframe generated based on the sequence of images 104 or may include fewer than all of the keyframes 114 associated with the sequence of image frames 104. For example, the one or more keyframes 114 may include a particular number of keyframes, such as a number of most recently generated keyframes such that the one or more keyframes 114 do not incur a large memory footprint.

As new keyframes 111 are generated and as additional image frames are received from the camera 102, the processor 106 may generate point cloud data 116. In a particular embodiment, the point cloud data 116 includes data regarding points (e.g., coordinates) in a 3D space, such as a collection of coordinates (e.g., x, y, and z coordinates or other coordinates) or equations to represent a particular shape. Generation of the point cloud data 116 is further described with reference to FIG. 3. In an illustrative embodiment, the point cloud data 116 may be generated based on data included in one or more image frames in the sequence of image frames 104, one or more keyframes stored in the memory 112, camera pose information computed by the processor 106 as described herein with reference to FIG. 2, or any combination thereof. For example, the point cloud data 116 may be generated in real time or near-real time relative to capture of the sequence of image frames 104, and, in an illustrative embodiment, the point cloud data 116 may be used during generation of a three-dimensional (3D) model of one or more objects captured by the camera 102, as further described herein. In a particular embodiment, the 3D model is generated based on interpolating the point cloud data 116, such as using the coordinates to identify points in 3D space that are a part of the 3D model.

During operation, the processor 106 may receive the first image frame 121 of the sequence of image frames 104 from the camera 102. The processor 106 may generate a first keyframe (e.g., the first keyframe of the one or more keyframes 114) based on the first image frame 121 since the first image frame 121 is the first (e.g., initial) image frame of the sequence of image frames 104, and thus no keyframe associated with the sequence of image frames 104 is stored in the memory 112. Generating the first keyframe may include down sampling the first image frame 121 to generate a lower resolution (e.g., QVGA) version of the first image frame 121 than a resolution at which the first image frame 121 was captured.

After receiving the first image frame 121, the processor 106 may receive the second image frame 122 from the camera 102. The processor 106 may determine the overlap ratio 109 between the second image frame 122 and the first keyframe. The overlap ratio 109 may be based on a pixel-by-pixel comparison of pixel values (e.g., a color value, an intensity value, or any combination thereof) of the second image frame 122 and corresponding pixel values of the keyframe 114. In some implementations, a particular resolution of the second image frame 122 used to determine the overlap ratio 109 may be the same resolution as the first keyframe (e.g., both are QVGA). In other implementations, the particular resolution of the second image frame 122 used to determine the overlap ratio 109 may be different than the resolution of the first keyframe and one or more pixel values of the second image frame 122 and/or the first keyframe may be interpolated to perform a pixel-by-pixel comparison to generate the overlap ratio 109.

The overlap ratio 109 may be compared to the overlap ratio threshold 131 and, based on a determination that the second image frame 122 is not substantially similar to the keyframe 114, the second image frame 122 may be used to generate a new keyframe 111 for storage in the memory 112. Alternatively, when the second image frame 122 is determined to substantially similar to the keyframe 114 based on the comparison, the second image frame 122 may not be used to generate a new keyframe 111. Generating the new keyframe 111 based on the second image frame 122 may include down sampling the second image frame 122 to generate a lower resolution (e.g., QVGA) version of the second image frame 122, or using a previously down-sampled version of the second image frame 122.

The system 100 in FIG. 1 may be used to selectively generate keyframes, such that the number of generated keyframes is less than the number of image frames of the sequence of image frames 104. Additionally, processing of the image frames to identify the keyframes may be performed at a reduced resolution as compared to a particular resolution of a received image of the sequence of image frames 104. By using a lower resolution to generate the keyframes 114, the generation of the point cloud data 116 and other processing operations may be performed in real time or in near-real time relative to the speed at which the sequence of image frames 104 is captured. Thus, the system of FIG. 1 may be used to generate point cloud data and/or a 3D model in real time, or near real time, relative to a rate of capturing of the sequence of image frames 104.

Figure 2:
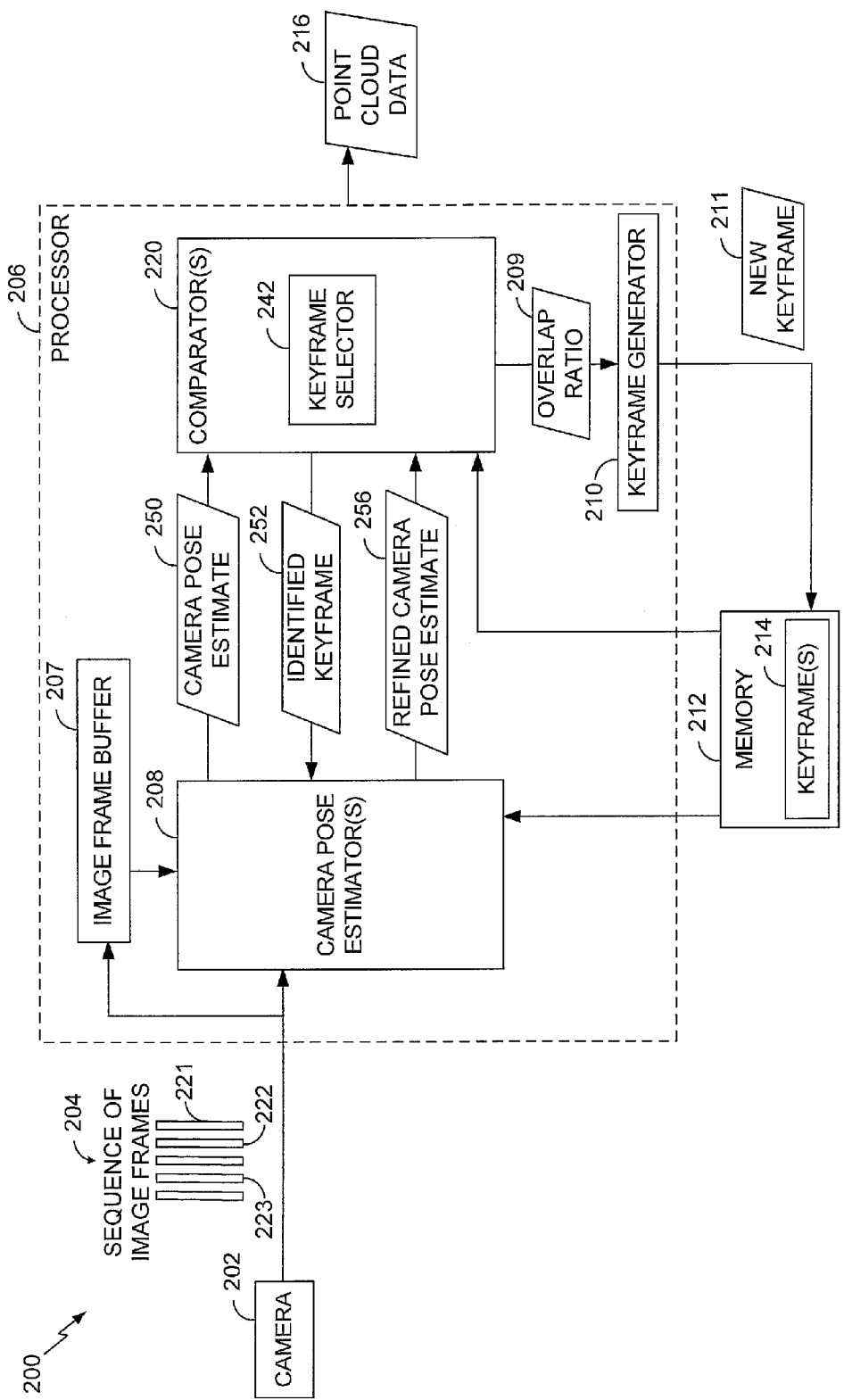
FIG. 2 is a block diagram of another particular illustrative embodiment of the system to generate point cloud data.

Referring to FIG. 2, another particular embodiment of a system 200 that is operable to selectively generate keyframes is shown. The system 200 includes a camera 202, a processor 206, and a memory 212. The processor 206 includes an image frame buffer 207, one or more camera pose estimators 208, one or more comparators 220, and a keyframe generator 210. The image frame buffer 207 may correspond to a cache and/or disk-based memory that is configured to receive a sequence of image frames 204 from the camera 202. Image frames from the image frame buffer 207 may be provided to the one or more camera pose estimators 208 such that multiple frames (e.g., a first image frame 221 and a second image frame 222) may be provided concurrently to the one or more camera pose estimators 208.

The one or more camera pose estimators 208 may generate camera pose information for one or more image frames in the sequence of image frames 204 and/or one or more keyframes generated by the keyframe generator 210. In some embodiments, the keyframe generator 210 may correspond to the keyframe generator 110 of FIG. 1. A camera pose estimate may be an approximation of a relative position (e.g., a coordinate associated with a difference of position relative to an initial position, such as an "origin" coordinate position) and orientation (e.g., an angle associated with a difference relative to an initial angle, such as an "origin" angle) of the camera 202 during the capture of a particular image frame. In a particular embodiment, one or more camera poses are estimated independent of location data, such as global positioning satellite (GPS) data, that associates the particular image frame with a particular location (e.g., geotagging). The camera pose estimate, in conjunction with the pixel values of a particular image frame, may be used to generate point cloud data 216. The point cloud data 216 may correspond to the point cloud data 116 of FIG. 1. In an illustrative embodiment, the one or more camera pose estimators 208 estimate a camera pose for a particular image frame based on a comparison between multiple image frames (e.g., the first image frame 221 and the second image frame 222). For example, the one or more camera pose estimators 208 may compare low resolution (e.g., QQVGA resolution, i.e., 160×120) versions of image frames in the sequence of image frames 204. Based on the comparison of the low resolution versions of the image frames, the one or more camera pose estimators 208 may generate a camera pose estimate 250. As described herein, the camera pose estimate 250 corresponds to the latter of the two image frames (e.g., the second image frame 222). To illustrate, the first image frame 221 of the sequence of image frames 204 may be used as an "origin" and each subsequent image frame of the sequence of image frames 204 may have a corresponding camera pose that is determined relative to the first image frame 221 (e.g., the "origin"). For example, a camera pose associated with the first image frame 121 may be represented as a reference point (e.g., point zero) having a relative angle of zero. In this example, subsequent camera pose estimates may be represented as a coordinate indicating relative motion in real space (e.g., (x,y,z) coordinates indicating an approximate change in distance) and an angle indicating a relative change in tilt of the camera 102 (e.g., 10° change in angle).

In an illustrative embodiment, generating a camera pose estimate 250 corresponding to the latter (e.g., later received and/or generated) of the two image frames includes generating a warped frame by warping (i.e., transforming) the latter captured frame based on relative motion of the camera 202 and an object (and/or a scene) being captured by the camera 202 between the two image frames. The latter captured frame is warped to become more similar to the earlier captured image frame as described herein with reference to FIG. 6.

In a particular embodiment, the camera pose estimate 250 generated by the one or more camera pose estimators 208 based on an image frame to image frame comparison may correspond to an "initial" camera pose. The camera pose estimate 250 may be "initial" by virtue of having been generated based on a low resolution (e.g., QQVGA) operation. The "initial" camera pose may be refined during a subsequent operation. In some embodiments, the "initial" camera pose estimate may be "initial" relative to a particular image frame, where subsequent image frames may have their own respective "initial" camera pose estimate. The one or more comparators 220 may select a most similar keyframe from the keyframes 214 using the keyframe selector 242, as described further herein. In some embodiments, the keyframe selector 242 uses the camera pose estimate 250 to select an identified keyframe 252, where the identified keyframe 252 is the most similar keyframe with respect to the camera pose estimate 250. The identified keyframe 252 (or an indication thereof) may be provided to the camera pose estimators 208.

The camera pose estimators 208 may receive the identified keyframe 252 and may refine an initial camera pose estimate, such as the camera pose estimate 250. For example, the camera pose estimators 208 may be configured to estimate a refined camera pose 256 corresponding to an image frame by comparing a QVGA version of the image frame to a QVGA resolution version of the identified keyframe 252 corresponding to a preceding image frame in the sequence of image frames 204. In some embodiments, the one or more comparators 220 may correspond to the comparator 108 of FIG. 1.

To illustrate, after an initial camera pose estimate corresponding to one of the image frames in the sequence of image frames 204 is determined, the one or more camera pose estimators 208 may generate a refined camera pose estimate 256 corresponding to the image frame by comparing that image frame to a keyframe 214 previously generated by the keyframe generator 210 and stored in the memory 212, such as a most recently generated keyframe or a most similar keyframe, such as the identified keyframe 252). The memory 212 may correspond to the memory 112 of FIG. 1. Determining an initial camera pose estimate 250 for the image frame 223 may include comparing the image frame 223 to a preceding image frame, such as the image frame 222 or another image frame. The one or more comparators 220 include a keyframe selector 242 configured to select the keyframe 214 from the memory 212. In some embodiments, the keyframe selector 242 may select the keyframe 214 based on similarities between the camera pose estimate 250 and a corresponding camera pose estimate of a particular keyframe of the one or more keyframes 214. In some embodiments, the similarity between the camera pose estimate 250 and the corresponding camera pose estimate of the particular keyframe may be based on a comparison between relative locations, orientations, or a combination thereof (e.g., coordinates and angles).

For example, to identify the most similar keyframe with respect to the camera pose estimate 250, the keyframe selector 242 may compare a relative position (e.g., a coordinate) and an orientation (e.g., an angle) of the camera pose estimate to one or more camera poses associated with the keyframes 214. To illustrate, each keyframe of the keyframes 214 may be associated with a camera pose that corresponds to a particular image frame of the sequence of image frames 204 used to generate the keyframe. For example, a first keyframe may be associated with the "origin", as described above. A second keyframe may be generated based on a particular image frame that is subsequent to the first image frame 221 and the second keyframe may be associated with a camera pose of the particular keyframe.

The keyframe selector 242 may identify a similar keyframe (or a most similar keyframe) of the keyframes 214 based on a relative position and/or a relative angle of the camera pose estimate 250. For example, the keyframe selector 242 may determine a first difference between the relative position of the camera pose estimate 250 and a relative position of a particular camera pose associated with a particular keyframe. Additionally or alternatively, the keyframe selector 242 may determine a second difference between the relative angle of the camera pose estimate 250 and a relative angle of the particular camera pose. The keyframe selector 242 may determine a first difference and/or a second difference for each of the keyframes 214 and may select the keyframe that results in the smallest difference value (e.g., smallest difference in relative position and/or smallest difference in relative angle) as the most similar keyframe.

As another example, the keyframe selector 242 may iteratively compare the camera pose estimate 250 to a set of one or more keyframes (of the keyframes 214) until the keyframe selector 242 identifies a particular keyframe that satisfies a relative position threshold and/or a relative distance threshold. For example, the keyframe selector 242 may determine the first difference and/or the second difference for a first keyframe (e.g., a most recently generated keyframe). The keyframe selector 242 may compare the first difference to the relative position threshold and/or may compare the second difference to the relative angle threshold. If the first difference satisfies (is less than or equal to) the relative position threshold and/or if the second difference satisfies (is less than or equal to) the relative angle threshold, the keyframe may be identified as being similar (e.g., the most similar) to the camera pose estimate 250 and the camera pose estimate 250 may not be compared to another keyframe (e.g., a keyframe generated prior to the most recently generated keyframe). If none of the set of one or more keyframes satisfies the relative position threshold and/or the relative angle threshold, a most similar keyframe is not selected and the keyframe generator 201 may be instructed to generate a new keyframe based on the image frame that corresponds to the camera pose estimate 250.

Generating the refined camera pose estimate 256 for the image frame 223 may involve comparing the image frame 223 to the particular keyframes stored in the memory 212, such as the keyframe that has a camera pose most similar to that of the camera pose estimate 250 corresponding to the image frame 223. In some embodiments, each keyframe of the one or more keyframes 214 is associated with a corresponding refined camera pose estimate 256.

The one or more comparators 220 may perform a pixel-by-pixel comparison of a QVGA resolution version of a particular image frame in the sequence of image frames 204 to the most similar keyframe in the memory 212. Based on the comparison of the particular image frame to the keyframe, the one or more comparators 220 may generate an overlap ratio 209 and provide the overlap ratio 209 to the keyframe generator 210. The keyframe generator 210 may compare the overlap ratio 209 to the overlap ratio threshold to determine whether the particular image frame and the keyframe are similar (e.g., no new keyframe is to be generated) or whether the particular image frame and the keyframe are dissimilar (e.g., an additional keyframe is to be generated). For example, when the particular image frame and the keyframe are dissimilar, the keyframe generator 210 may generate a new keyframe 211. In some embodiments, the overlap ratio 209 and the overlap ratio threshold correspond to the overlap ratio 109 and the overlap ratio threshold 131 of FIG. 1, respectively.

The overlap ratio 209 may be generated by the one or more comparators 220 based on the warped comparison described herein. Alternatively, the camera pose estimate 250 may be generated based on warping the image frame to become more similar to an earlier captured (or generated) keyframe, as described herein. In another alternative embodiment, the overlap ratio 209 may be generated based on a comparison between the refined camera pose estimate 256 and corresponding camera pose estimates of the keyframes 214. The overlap ratio 209 may be expressed in terms of percentage, number of pixels, or in some other fashion. The one or more comparators 220 may determine a pixel intensity error, where the pixel intensity error indicates a difference in pixel intensity between one or more pixels of the warped frame and one or more pixels of the prior captured frame in the pair of image frames (or one of the keyframes 114). The one or more camera pose estimators 208 may then determine a depth error that indicates a difference of depth between the one or more pixels of the warped frame and the one or more pixels of the prior captured frame (or the prior keyframe). An example of determining pixel intensity and depth errors is further described with reference to FIG. 7. The pixel intensity error and depth error may be used to estimate the camera pose for the latter captured image frame.

In a particular embodiment, initial camera pose information may be generated by a first thread of the processor 206, and refined camera poses may be estimated by a second processing thread of the processor 206. The first processing thread and the second processing thread may be executed by the processor 206 in parallel (e.g., concurrently). The first processing thread may include or correspond to a first processing core of the processor 206 and the second processing core may include or correspond to a second processing core of the processor 206. Parallel processing enables the second processing thread to execute operations to refine camera poses without interrupting the initial estimation of camera poses as described above. In an illustrative embodiment, the one or more camera pose estimators 208 are configured to be executed by different processing threads of the processor 206. The different processing threads may be executed in parallel in multiple processor cores and/or in a time multiplexed fashion in a single processing core. Although the first and second processing threads are described as being included in a single processor (e.g., the processor 206), in other implementations the first processing thread may be included in a first processor and the second processing thread may be included in a second processor that is distinct from the first processor.

The one or more camera pose estimators 208 may perform comparisons between image frames (e.g., the first image frame 221 and the second image frame 222) or between an image frame (e.g., the second image frame 222) and a keyframe (e.g., one of the keyframes 214). For example, the one or more camera pose estimators 208 may compare, pixel-by-pixel or in some other fashion, pairs of consecutive image frames in the sequence of image frames 204. To illustrate, the one or more camera pose estimators 208 may compare the first image frame 221 and the second image frame 222. In a particular embodiment, the image frame to image frame comparison performed by the one or more camera pose estimators 208 may be independent of (e.g., not based on) landmarks or other such features (e.g., edges, vertices), but may rather be performed on a per-pixel basis.

Thus, the one or more camera pose estimators 208 may perform a pixel-by-pixel comparison instead of searching for landmarks in image frames in the sequence of image frames 204. Results of the comparison performed by the one or more camera pose estimators 208 may be provided as the camera pose estimate 250 to the one or more comparators 220.

During operation, the camera pose estimator 208 may generate camera pose information, and the keyframe generator 210 may generate new keyframes 211, as applicable. The processor 206 may use such information to the generate point cloud data 216 in real time or in near-real time relative to the capturing of the sequence of image frames 204. In a particular embodiment, each of the camera poses generated by the one or more camera pose estimators 208 indicates an approximation of the positioning of the camera 202 corresponding to a particular time when a corresponding image frame in the sequence of image frames 204 was captured. The processor 206 may receive one or more additional image frames in the sequence of image frames 204 from the camera 202 and may update the point cloud data 216, e.g. a three-dimensional point cloud, based on the one or more additional image frames. In a particular embodiment, a rate of updating the three-dimensional point cloud is substantially equal to a rate of receiving the one or more additional image frames. The first processing thread may be configured to process QQVGA image frames at a sufficient rate to operate during capture of the sequence of image frames 204. Thus, the point cloud data 216 may be updated in real time or in near-real time relative to the image capture operations of the camera 202. An example of such real time or near-real time generation of point cloud data is further illustrated with reference to FIG. 3.

Thus, the system of FIG. 2 may process multiple resolutions of frames and selectively generate keyframes and update point cloud data to perform near-real time or real time operation at a point cloud/3D model generation device. In an illustrative embodiment, each of the image frames captured by the camera 202 are high resolution image frames (e.g., HD resolution), the keyframes 214 stored in the memory 212 are medium resolution frames (e.g., QVGA frames), and the image-frame-to-image-frame comparisons performed by the one or more camera pose estimators 208 are performed at a low resolution (e.g., QQVGA resolution). In an illustrative embodiment, the QVGA and the QQVGA versions of the image frames in the sequence of image frames 104 may be generated based on downsampling, resizing, or other techniques.

Figure 3:
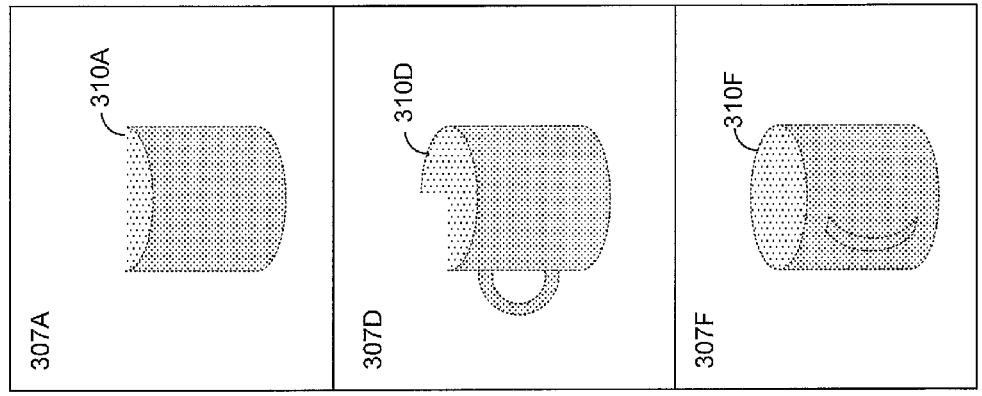
FIG. 3 is a perspective view of a scene being captured by an image capture device, the scene including illustration of a time-lapse depiction of point cloud data being generated in near real time.
Figure 3:
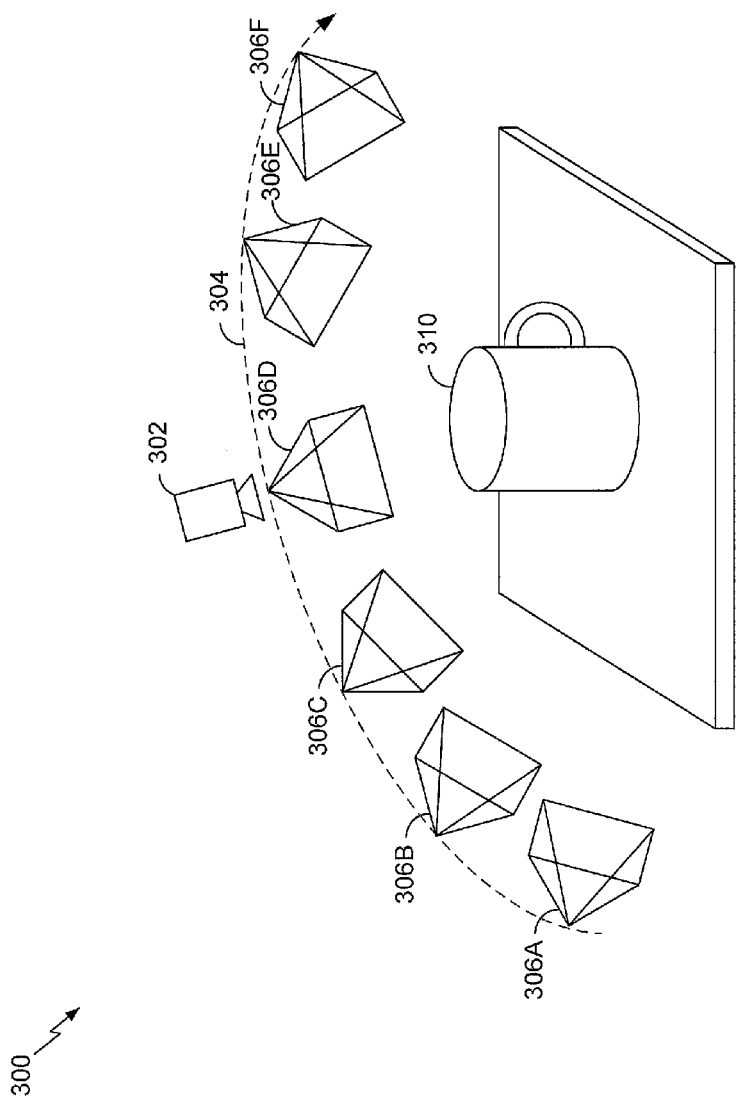

Referring to FIG. 3, an illustrative embodiment of operation of the system 100 of FIG. 1 or the system 200 of FIG. 2 is shown and generally designated 300. In FIG. 3, an image capture device 302, such as the camera 102 of FIG. 1 or the camera 202 of FIG. 2, is moved along a path 304 (e.g., an arc) about an object 310, such as a cup as shown in FIG. 3. During the movement of the image capture device 302 along the path, the image capture device 302 is located at various positions illustrated in FIG. 3 by camera poses 306A, 306B, 306C, 306D, 306E, and 306F. It should be noted that the number, separation, and orientation of the camera poses 306A-F shown in FIG. 3 are shown for illustration only, and are not to be considered limiting. For example, more camera poses or fewer camera poses may be used.

The path 304 may be of any configuration, based on how the image capture device 302 is moved around the object 310. As the image capture device 302 is moved along the path 304 from a position associated with the camera pose 306A to a position associated with the camera pose 306F, a 3D point cloud of the object 310 may be generated in real time or near-real time, as described above with reference to FIG. 1 and FIG. 2. For example, at the camera pose 306A, which represents an initial camera pose of the image capture device 302 at a first position along the path 304, a first partial 3D point cloud 310A may be generated at the image capture device 302, as shown at 307A. As the image capture device 302 continues to move along the path 304, additional data may be captured and used to add points to the partial 3D point cloud. For example, when the computing device 302 has moved along the path 304 to a position associated with the camera pose 306D, a more complete 3D point cloud 310D may be generated, as shown at 307D. After the image capture device 302 reaches a position associated with the camera pose 306F, a completed 3D point cloud 310F may be generated, as shown at 307F.

Thus, FIG. 3 illustrates near-real-time or real-time generation of 3D point cloud data based on motion of the image capture device 302 using images captured by the image capture device 302. Completeness of the 3D point cloud data may depend on the number of images captured and the positioning of the image capture device 302. For example, during generation of the 3D point cloud data, the 3D point cloud data may be incomplete (e.g., before the image capture device 302 reaches the position associated with the camera pose 306F), which may lead to generation of an incomplete 3D representation of the object 310 if additional 3D point cloud data is not gathered. To illustrate, if the image capture device 302 does not capture images of the object 310 from all visible angles of the object 310, a 3D representation of the object 310 may be incomplete. In this case, more images may need to be captured by the image capture device 302 to complete or fill in gaps in the 3D representation of the object 310.

Figure 4:
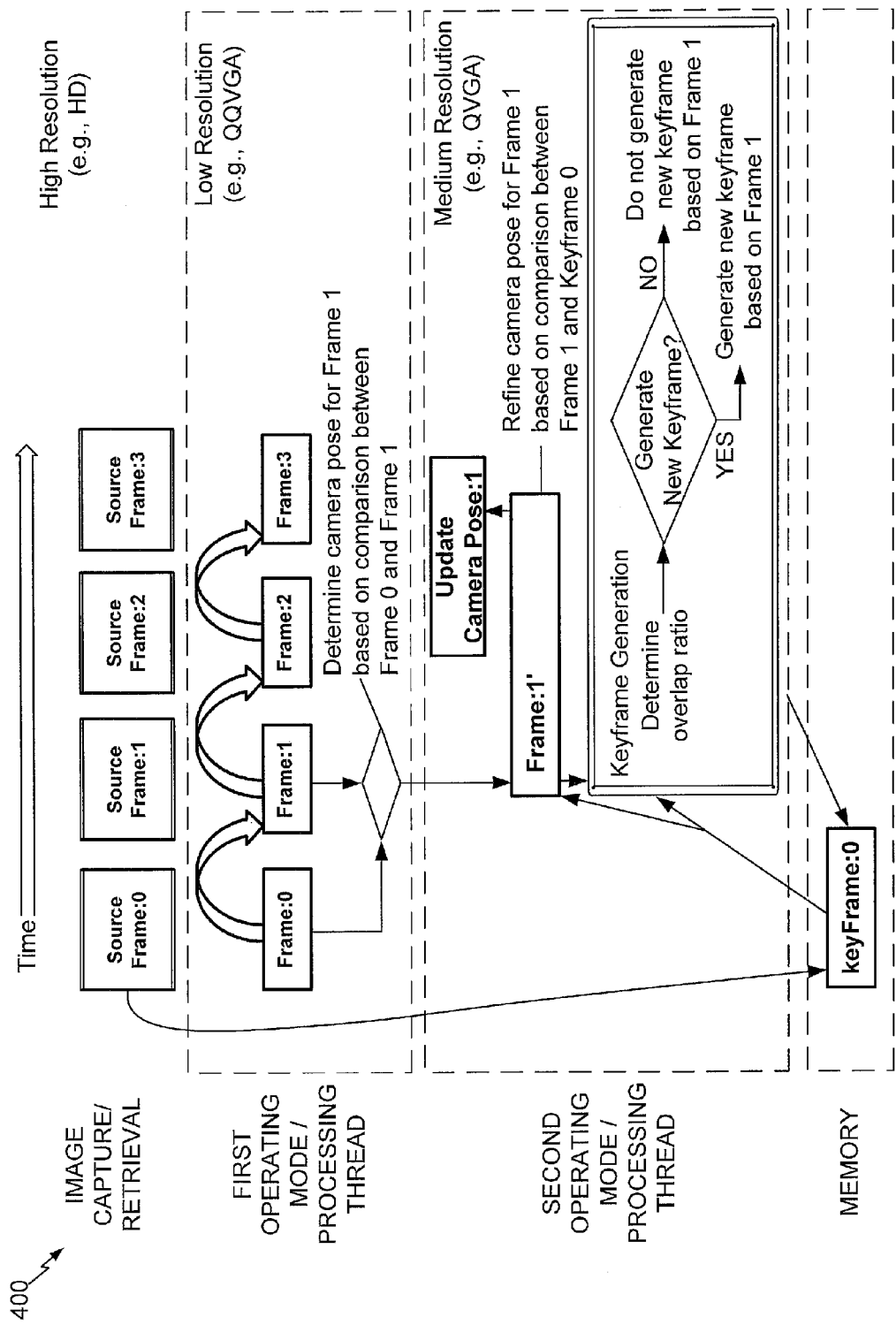
FIG. 4 is a diagram that illustrates generating camera poses or new keyframes based on the sequence of image frames.

Referring to FIG. 4, a diagram 400 related to the system 100 of FIG. 1 or to the system 200 of FIG. 2 is shown. In FIG. 4, different operational levels or processing threads are shown horizontally. FIG. 4 includes an image capture/retrieval level, a first operating mode/processing thread, a second operating mode/processing thread, and a memory operation level. In an illustrative embodiment, the image capture/retrieval level corresponds to operations performed by the camera 102 of FIG. 1, the camera 202, the image capture device 302, or a combination thereof. The first operation mode/processing thread may correspond to operations performed by the comparator 108 of FIG. 1 or by the comparator(s) 220 of FIG. 2. The second operating mode/processing thread may correspond to operations performed by the one or more comparators 220 of FIG. 2. The memory may correspond to the memory 112 of FIG. 1 or to the memory 212 of FIG. 2.

As shown in FIG. 4, different operational segments may involve processing image data that has different resolutions, such as HD, QQVGA, and QVGA resolutions. In the embodiment of FIG. 4, the image capture/retrieval level receives, generates and/or processes high resolution (HD) data, the first operating mode/processing thread receives, generates and/or processes low resolution (e.g., QQVGA) data, and the second operating mode/processing thread receives, generates and/or processes medium resolution (e.g., QVGA) data. For example, the image capture/retrieval level may receive a sequence of image frames (e.g., source frame:0, source frame:1, source frame:2, and source frame:3 in FIG. 4) over a period of time. The first operating mode/processing thread may down sample each of the source frames to generate a corresponding frame (e.g., frame:0, frame:1, frame:2, and frame:3 in FIG. 4) for use in camera pose estimation. Similarly, the second operating mode/processing thread may down sample at least some of the source frames to generate a corresponding frame (e.g., frame:1' in FIG. 4) for keyframe generation. Alternatively, the second operating mode/processing thread may use source frames at full resolution (e.g., HD) for keyframe generation. In a particular embodiment, down sampled versions of the source frames may be provided to the first operating mode/processing thread, the second operating mode/processing thread, or both, from another processing thread or from another device (e.g., a device that provides the sequence of image frames).

When a first frame (e.g., a first image frame in a sequence of image frames), such as source frame:0, is captured or received, the first frame may automatically be used to generate a keyframe, such as keyframe:0. In an illustrative embodiment, generation of keyframe:0 includes making a QVGA resolution copy of the source frame:0 and storing the QVGA resolution copy of the source frame:0 at a memory. As shown in the first operating mode/processing thread, each of the source frames corresponds to a QQVGA frame that may be compared to a preceding QQVGA frame. For example, as shown in FIG. 4, a camera pose for frame:1 may be determined based on a comparison of frame:1 with frame:0. Similarly, a camera pose for frame:2 may be generated based on a comparison of frame:2 with frame:1, a camera pose for frame:3 may be generated based on a comparison of frame:3 with frame:2, etc. In an illustrative embodiment, the camera pose information may be generated as described with reference to the one or more camera pose estimators 208 of FIG. 2 and may be stored in the memory.

The second operating mode/processing thread involves refining camera poses determined by the first operating mode/processing thread, as described with reference to the one or more camera pose estimators 208 of FIG. 2 and determining whether a new keyframe should be generated, as described with reference to the keyframe generator 110 of FIG. 1 or the keyframe generator 210 of FIG. 2. For example, as shown in FIG. 4, frame:1 at a QVGA resolution is compared to keyframe:0 to determine an overlap ratio, such as the overlap ratio 109 of FIG. 1 or the overlap ratio 209 of FIG. 2. Based on a comparison of frame:1 with keyframe:0, the camera pose determined with respect to the QQVGA version of frame:1 may be refined to create a refined camera pose estimate, as described with reference to FIG. 2. The refined camera pose estimate is then used to update the camera pose estimate, associated with the particular frame generated by the first operating mode/processing thread. For example, the camera pose estimate for frame:1 is updated to reflect the corresponding refined camera pose estimate. Further, when a comparison of the generated overlap ratio to an overlap ratio threshold, such as the overlap ratio 131 of FIG. 1, indicates that frame:1 is dissimilar to keyframe:0, a new keyframe may be generated and stored in the memory, as described with reference to FIGS. 1 and 2. In the embodiment shown in FIG. 4, a new keyframe is not generated because the comparison of the overlap ratio to the overlap ratio threshold indicates that frame:1 is similar to keyframe:0.

Figure 5:
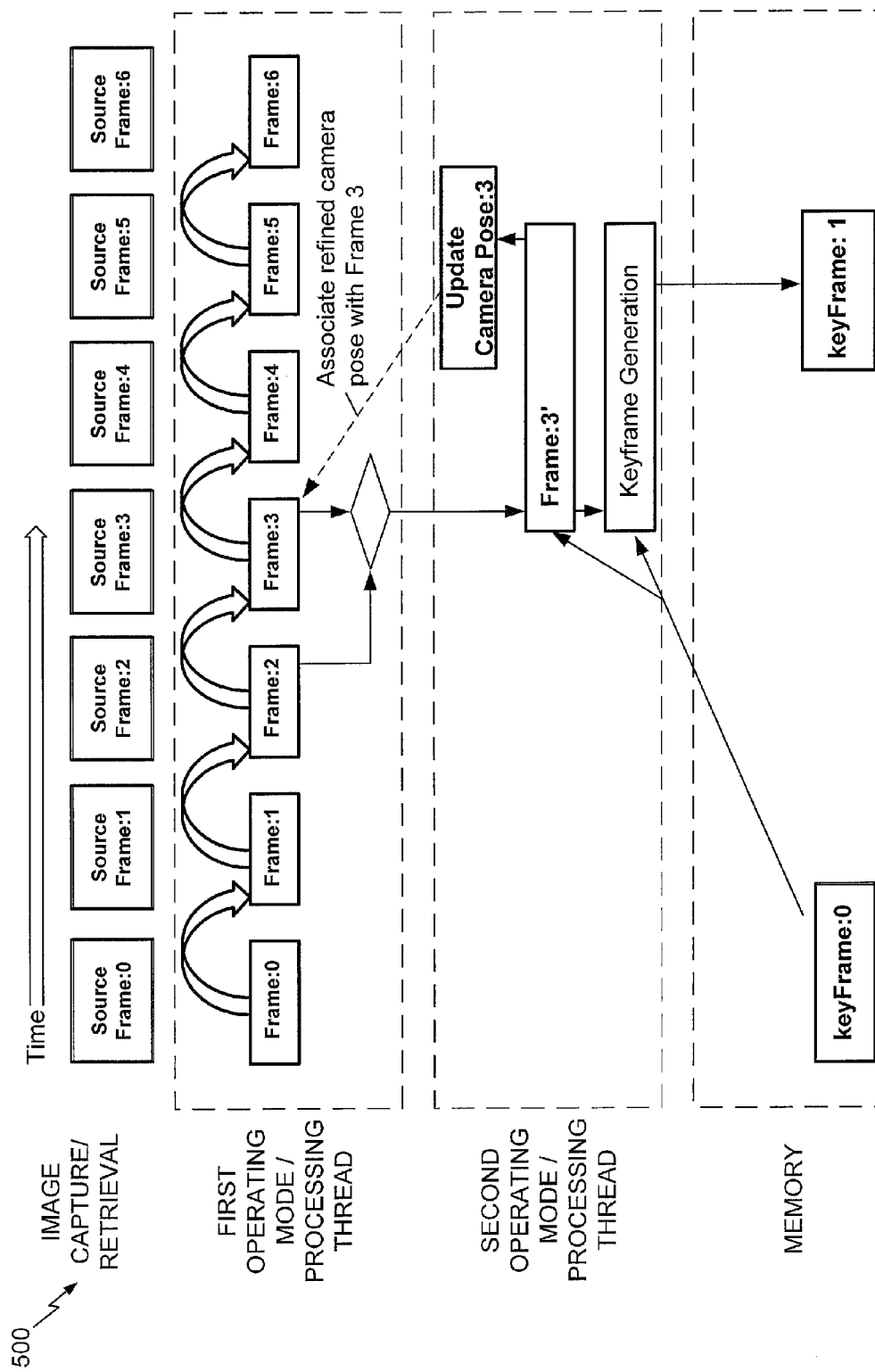
FIG. 5 is a subsequent view of the diagram of FIG. 4 including use of additional image frames to generate a new keyframe.

Referring to FIG. 5, a diagram 500 illustrating a continuation of operations described with reference to FIG. 4 is shown. In FIG. 5, additional HD source frames have been received from the image capture device. For example, as shown in FIG. 5, a source frame:4, a source frame:5, and a source frame:6 have been received. In the first operating mode/processing thread, consecutive pairs of image frames are compared to generate initial camera pose information.

Selected QVGA processing is performed by the second operating mode/processing thread. For example, in FIG. 5, frame:2 is compared to frame:1 to generate an initial camera pose for frame:2. However, frame:2 is not compared at the QVGA resolution, because the comparison illustrated in FIG. 4 between the QVGA resolution of frame:1 and the QVGA resolution of keyframe:0 takes additional processing time due to the higher resolution. Accordingly, the second processing thread may be unable to compare new frames until the first comparison is completed. Thus, in the example of FIG. 5, the second operating mode/processing thread processes frame:3, not frame:2, after processing frame:1. As described with reference to FIG. 4, keyframe:0 may be compared to frame:3 to determine an overlap ratio and whether the overlap ratio satisfies or does not satisfy the overlap ratio threshold. When the comparison indicates that keyframe:0 and frame:3 are dissimilar, a new keyframe may be generated. For example, as shown in FIG. 5, frame:3 is sufficiently different from keyframe 0, so a new keyframe, denoted keyframe:1, is generated based on frame:3. The camera pose estimate associated with frame:3 may be updated to reflect the refined camera pose estimate associated with frame:3 for use in future comparisons in the first operating mode/processing thread.

Figure 6:
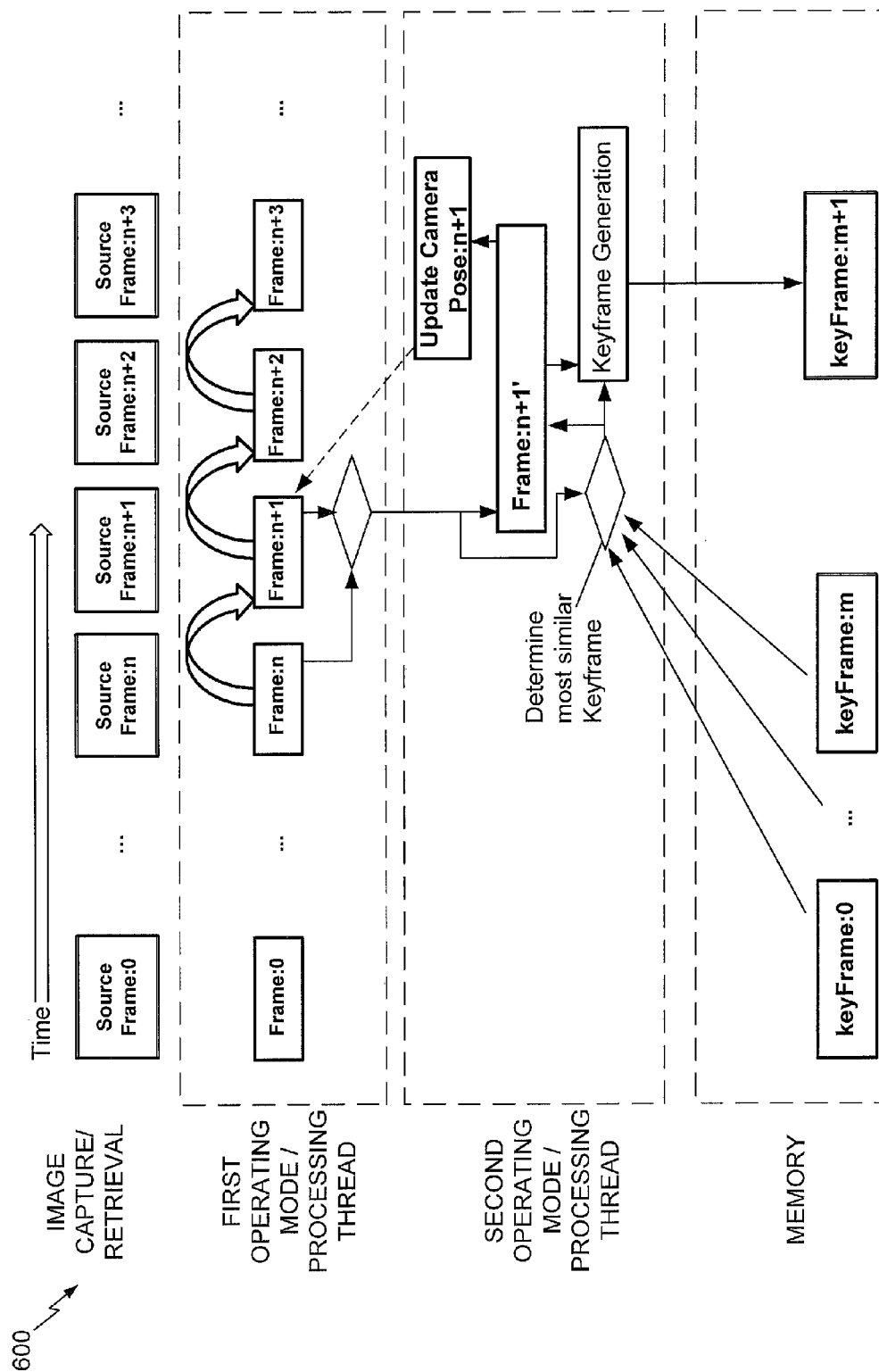
FIG. 6 is a subsequent view of the diagrams of FIGS. 4 and 5 including use of additional image frames to generate a new keyframe.

Referring to FIG. 6, a diagram 600 illustrating a continuation of operations described with reference to FIGS. 4 and 5 is shown. In FIG. 6, additional HD source frames have been received from the image capture device. For example, as shown in FIG. 6, a source frame:n, a source frame:n+1, a source frame n+2, and a source frame:n+3 have been received, where n may be any non-negative integer. In the first operating mode/processing thread, consecutive pairs of image frames are compared to generate initial camera pose information. Selected QVGA processing is performed by the second operating mode/processing thread. For example, in FIG. 6, frame:n+1 is compared to frame:n to generate an initial camera pose for frame:n+1. As described with reference to FIGS. 4 and 5, keyframe:0 to keyframe:m, where m is a non-negative integer, may be compared to frame:n+1 to determine an overlap ratio associated with frame:n+1. For example keyframe:0 may be compared to frame:n+1 to determine a first overlap ratio, keyframe:1 may be compared to frame:n+1 to determine a second overlap ratio, and keyframe:m may be compared to frame:n+1 to determine a third overlap ratio. The second operating mode/processing thread is configured to determine a most similar keyframe from keyframe:0 to keyframe m based on the camera pose estimated in the first operating mode/processing thread. In a particular implementation, the most similar keyframe is selected based on a highest overlap ratio value identified from among the first to third overlap ratios. If the highest overlap ratio value does not satisfy the overlap ratio threshold, a new keyframe may be generated. For example, as shown in FIG. 5, frame:n+1 is sufficiently different from keyframe:0 to keyframe:m (such that the overlap ratio does not satisfy the overlap ratio threshold), so a new keyframe, denoted keyframe:m+1, is generated based on frame:n+1. The camera pose estimate associated with frame:n+1 may be updated to reflect the refined camera pose estimate associated with frame:n+1 for use in future comparisons in the first operating mode/processing thread.

Figure 7:
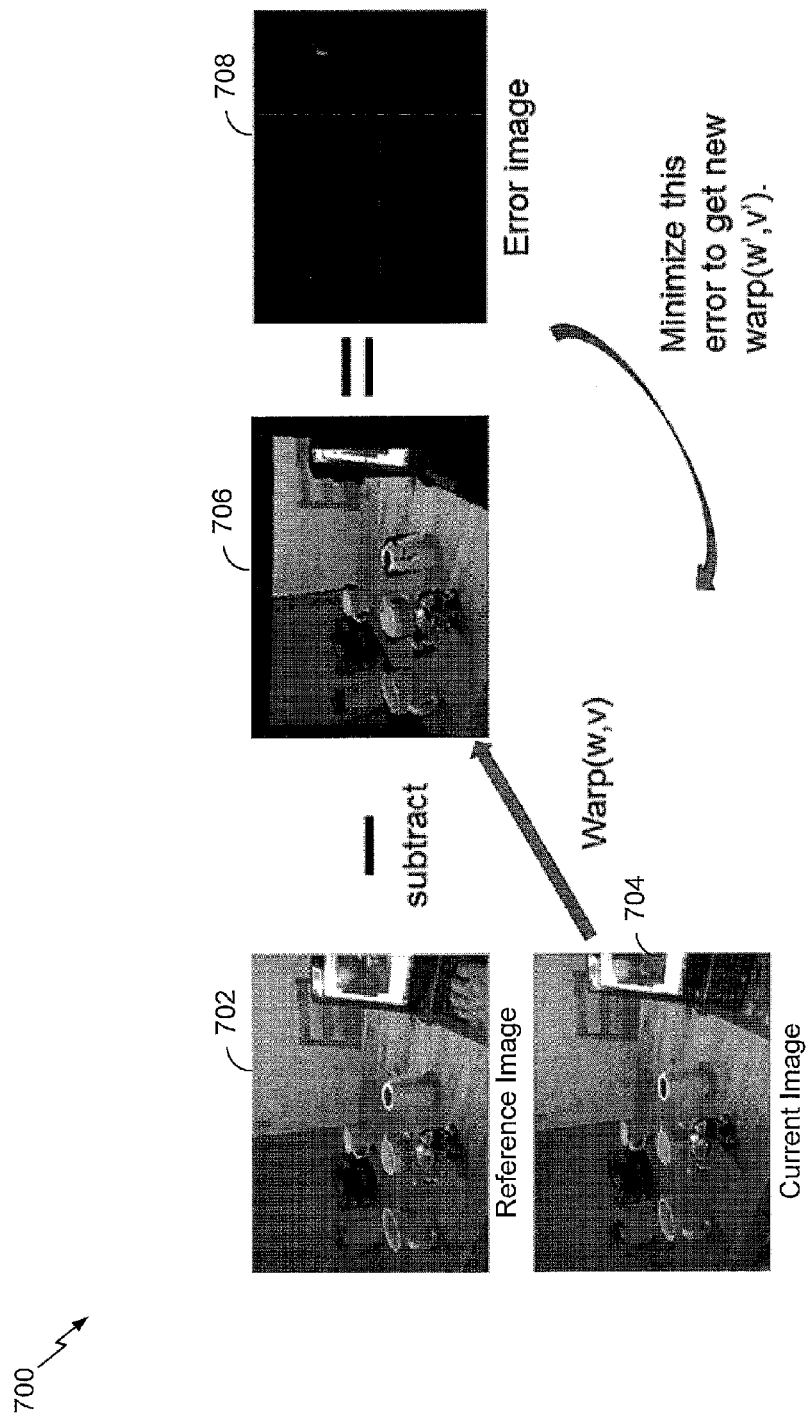
FIG. 7 is a diagram that illustrates determining a pixel intensity error and/or a depth error between two image frames of the sequence of image frames.

Referring to FIG. 7, a particular embodiment of a method of performing operations including determining a frame error as part of estimating a camera pose is shown and generally designated 700. For example, the operations may be performed by the one or more comparators 220 of FIG. 2 and/or the first processing thread of FIGS. 4-6. In the embodiment of FIG. 7, a reference image 702 is compared to a "current" image 704. The "current" image 704 may be the image for which camera pose information is being estimated. Thus, the "current" image 704 may correspond to a most recently captured image frame. The reference image 702 may correspond to a previously captured image frame or to a keyframe generated/stored based on a previously captured image frame. To illustrate, referring to FIG. 5, the current image 704 may correspond to frame:3 and the reference image 702 may correspond to frame:2 or keyframe:0. As another example, the current image 704 may correspond to frame:6 and the reference image 702 may correspond to frame:5 or keyframe:1.

As shown in FIG. 7, the current image 704 may be warped to generate a warped current image 706. The current image 704 may be warped such that the warped current image 706 closely approximates the reference image 702 after the warping process is complete. The reference image 702 may be compared to the warped current image 706. For example, a subtraction operation may be performed between the reference image 702 and the warped current image 706 to generate an error image 708. The error image 708 indicates pixel intensity and/or depth error between the reference image 702 and the warped current image 706. The pixel intensity and the depth error may be used in a cost function C that may be represented by the following equation:

$$C = \Sigma \tfrac{1}{2} [I_2'(T(\epsilon) \oplus P_1)) - I_1(\pi(P_1))]^2 + \tfrac{1}{2} [(T^{-1}(\epsilon) \oplus P_2' - P_1)^T \hat{n}_1]^2$$

In the above equation, I represents a pixel intensity image corresponding to a particular image frame. The variable P represents a measured 3D point from a depth image corresponding to the particular image frame. The variable n represents a normal (e.g., a normal value) from the depth image. The function $\pi(\ )$ represents a camera projection model. The variable $\epsilon$ represents a 6×1 vector in Euclidian se(3) space. The function $T(\epsilon)$ represents a transformation from se(3) to SE(3) space. The function $T(\epsilon) \oplus P$ applies the SE(3) transformation to a particular point.

The result of the cost function C may be compared to a cost threshold by the one or more comparators 220 of FIG. 2. If the result satisfies the cost threshold, the one or more camera pose estimators 208 may generate a camera pose estimate and associate the camera pose estimate with the current image 704. If the result does not satisfy the cost threshold, the current image 704 is warped again to generate a revised warped current image 706 to reduce the pixel intensity and/or depth error.

Figure 8:
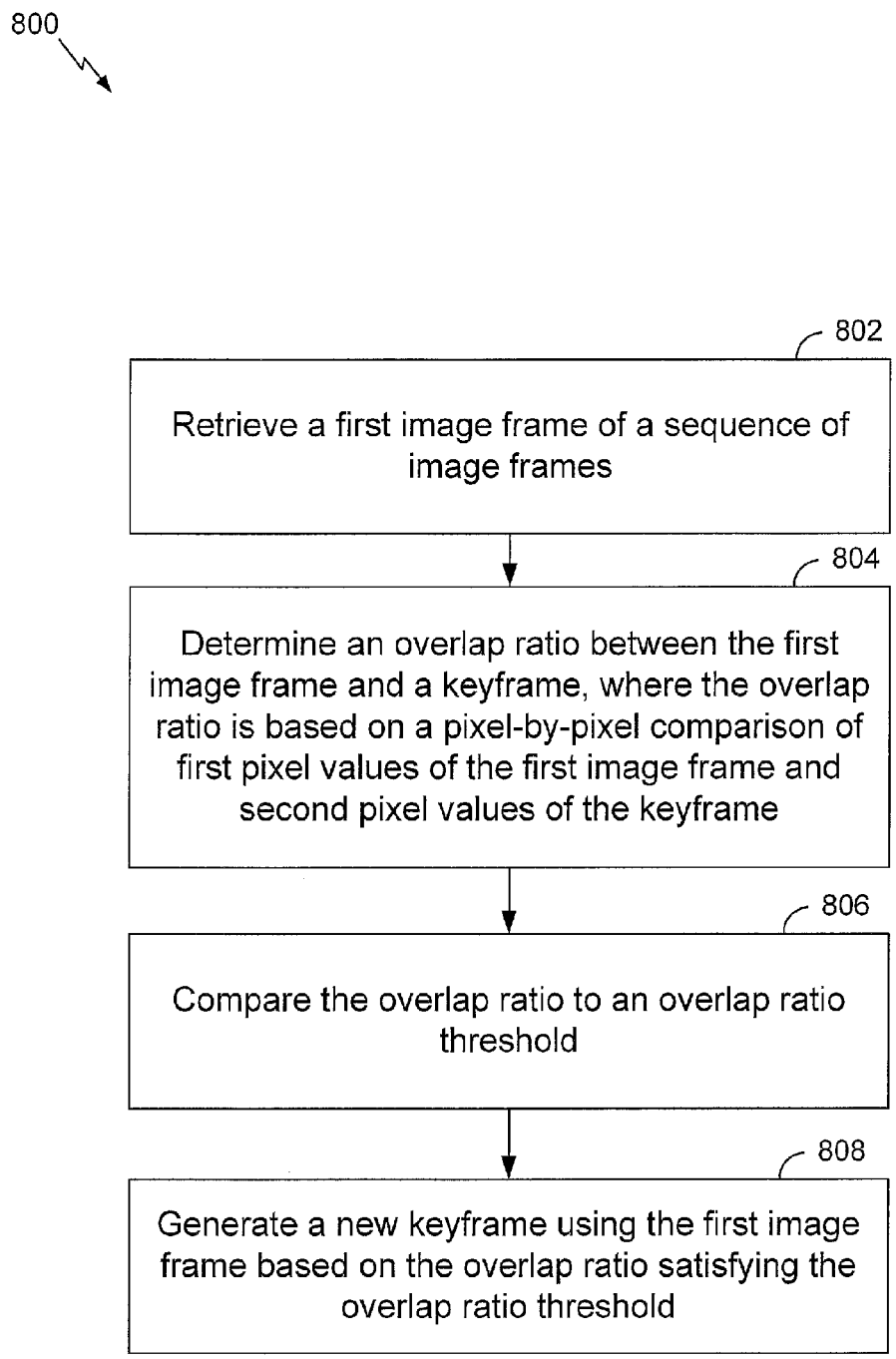
FIG. 8 is a flow diagram of a particular illustrative embodiment of a method of generating a new keyframe.

Referring to FIG. 8, a method 800 for generating a new keyframe based on a sequence of image frames is illustrated. In an illustrative embodiment, the method 800 may be performed by the processor 106 of FIG. 1 or the processor 206 of FIG. 2.

The method 800 includes receiving a first image frame of a sequence of image frames, at 802. For example, the sequence of image frames may be captured by an image capture device, such as the camera 102 of FIG. 1, the camera 202 of FIG. 2, or the image capture device 302 of FIG. 3. The method 800 further includes determining an overlap ratio between the first image frame and a keyframe, at 804. The determination of the overlap ratio is based on a pixel-by-pixel comparison of first pixel values of the first image frame and second pixel values of the keyframe. For example, the determination of the overlap ratio may be performed by the comparator 108 of FIG. 1 or the one or more comparators 220 of FIG. 2. The overlap ratio may be associated with a ratio, a value, or a percentage of pixels that are similar between the first image frame and the keyframe. Alternatively, the overlap ratio may be associated with a ratio, a value, or a percentage of pixels that are dissimilar between the first image and the keyframe image.

The method 800 also includes comparing the overlap ratio to an overlap ratio threshold, at 806. For example, the comparison may be performed by the keyframe generator 110 of FIG. 1 or the keyframe generator 210 of FIG. 2. The method 800 further includes generating a new keyframe using the first image frame based on the overlap ratio not satisfying the overlap ratio threshold, at 808. For example, when the overlap ratio threshold corresponds to a threshold ratio, a threshold value or a threshold percentage of pixels to be similar between the first image frame and the key, the overlap ratio threshold may be satisfied when the comparison indicates the overlap ratio is greater than or equal to the overlap ratio threshold. As another example, when the overlap ratio threshold corresponds to a threshold ratio, a threshold value or a threshold percentage of pixels to be dissimilar between the first image frame and the key, the overlap ratio threshold may be satisfied when the comparison indicates the overlap ratio is less than or equal to the overlap ratio threshold. The new keyframe may be the new keyframe 111 stored in the memory 112 of FIG. 1 or the new keyframe 211 store in the memory 212 of FIG. 2. The method 800 of FIG. 8 may thus enable selective generation of keyframes, enabling the number of generated keyframes to be fewer than a captured number of image frames. By generating fewer keyframes, generation of point cloud data and other processing operations may be performed faster (e.g., in real time or near real time relative to a speed at which image frames are being captured).

Figure 9:
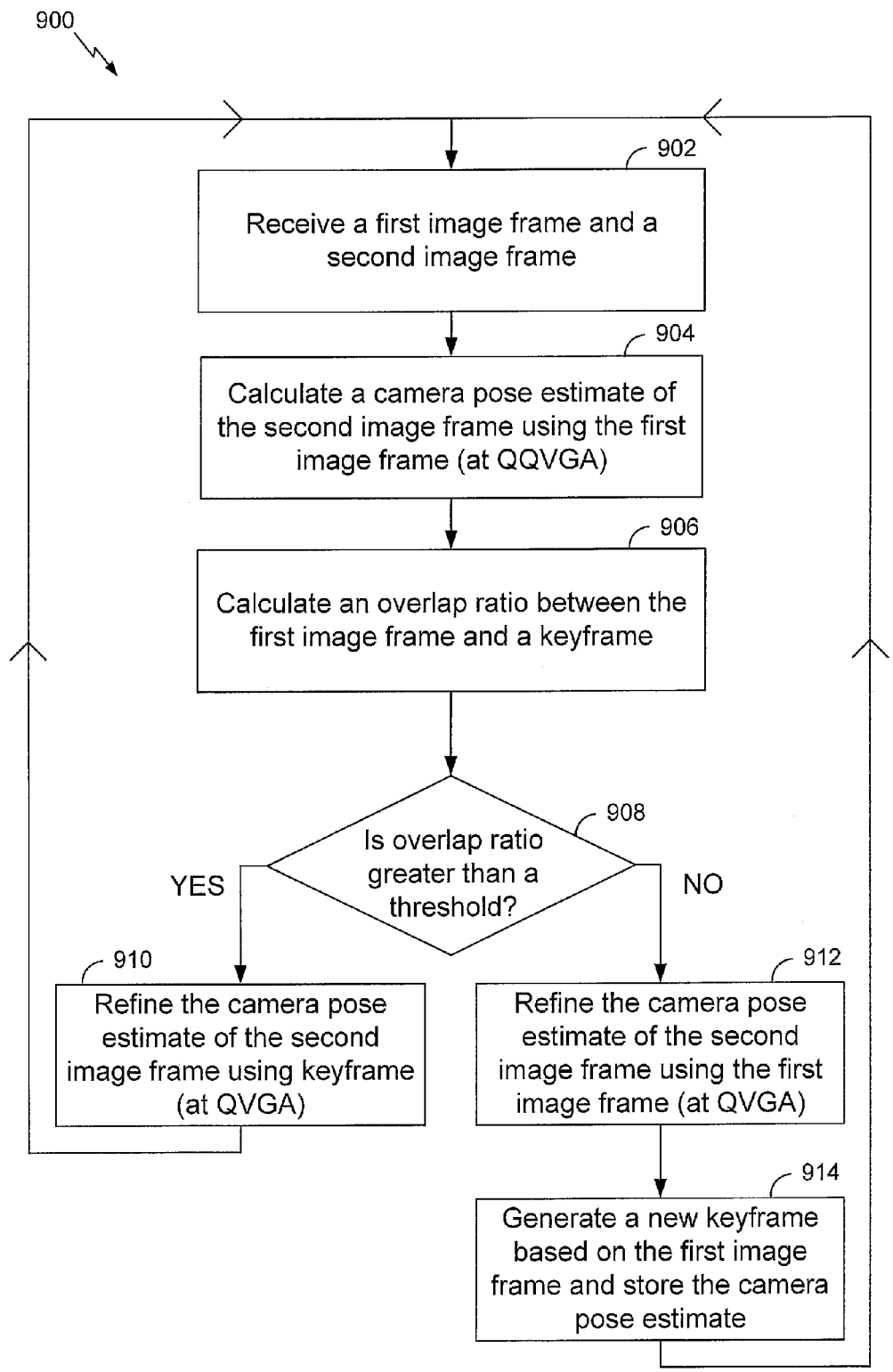
FIG. 9 is a flow diagram of a particular illustrative embodiment of a method of estimating camera poses of image frames in a sequence of image frames.

Referring to FIG. 9, a method 900 for refining a camera pose estimate of an image frame is illustrated. In an illustrative embodiment, the method 900 may be performed by the processor 106 of FIG. 1 or the processor 206 of FIG. 2.

The method 900 includes receiving a first image frame and a second image frame, at 902. The first and second image frames may be received from an image capture device, such as the camera 102 of FIG. 1, the camera 202 of FIG. 2, or the image capture device 302 of FIG. 3. The method 900 includes calculating a camera pose estimate of the second image frame using the first image frame at a low resolution (e.g., QQVGA resolution), at 904. Generation of the camera pose estimate may be performed by the one or more camera pose estimators 208 of FIG. 2. The camera pose estimate may include or may be based on information resulting from a comparison of the first image frame and the second image frame that may be performed by the one or more comparators 220 of FIG. 2. The method 800 further includes calculating an overlap ratio between the first image frame and a keyframe, at 806. The overlap ratio may be calculated at the comparator 108 of FIG. 1 or the one or more comparators 220 of FIG. 2.

The method 900 also includes determining whether the overlap ratio is greater than an overlap ratio threshold, at 908. The determination may be performed by the keyframe generator 110 of FIG. 1 or the keyframe generator 210 of FIG. 2. If the overlap ratio is greater than the overlap ratio threshold (e.g., the first frame and the keyframe are relatively similar) the method 900 includes refining the camera pose estimate of the second image frame using the keyframe at a medium resolution (e.g., QVGA resolution), at 910. After refining the camera pose estimate of the second image frame, the method 900 is repeated with a new set of image frames, without generating a new keyframe based on the first image frame. In a particular embodiment, the new set of image frames includes the second image frame and a third image frame that is subsequent to the second image frame.

If the overlap ratio is less than the overlap ratio threshold, the method 900 includes refining the camera pose estimate of the second image frame using the first image frame at the medium resolution (e.g., QVGA resolution), at 912. In some implementations, when the overlap ratio is determined to be equal to the overlap ratio threshold, at 908, the method may advance to 910. In other implementations, when the overlap ratio is determined to be equal to the overlap ratio threshold, at 908, the method may advance to 912. The method 900 further includes generating a new keyframe based on the first image frame and storing the camera pose estimate to memory, such as the memory 112 of FIG. 1 or the memory 212 of FIG. 2, at 914. After generating the new keyframe, the method 900 may be repeated with a new set of image frames. In a particular embodiment, the new set of image frames includes the second image frame and a third image frame that is subsequent to the second image frame. When no additional image frames are received, the method 900 may terminate.

Figure 10:
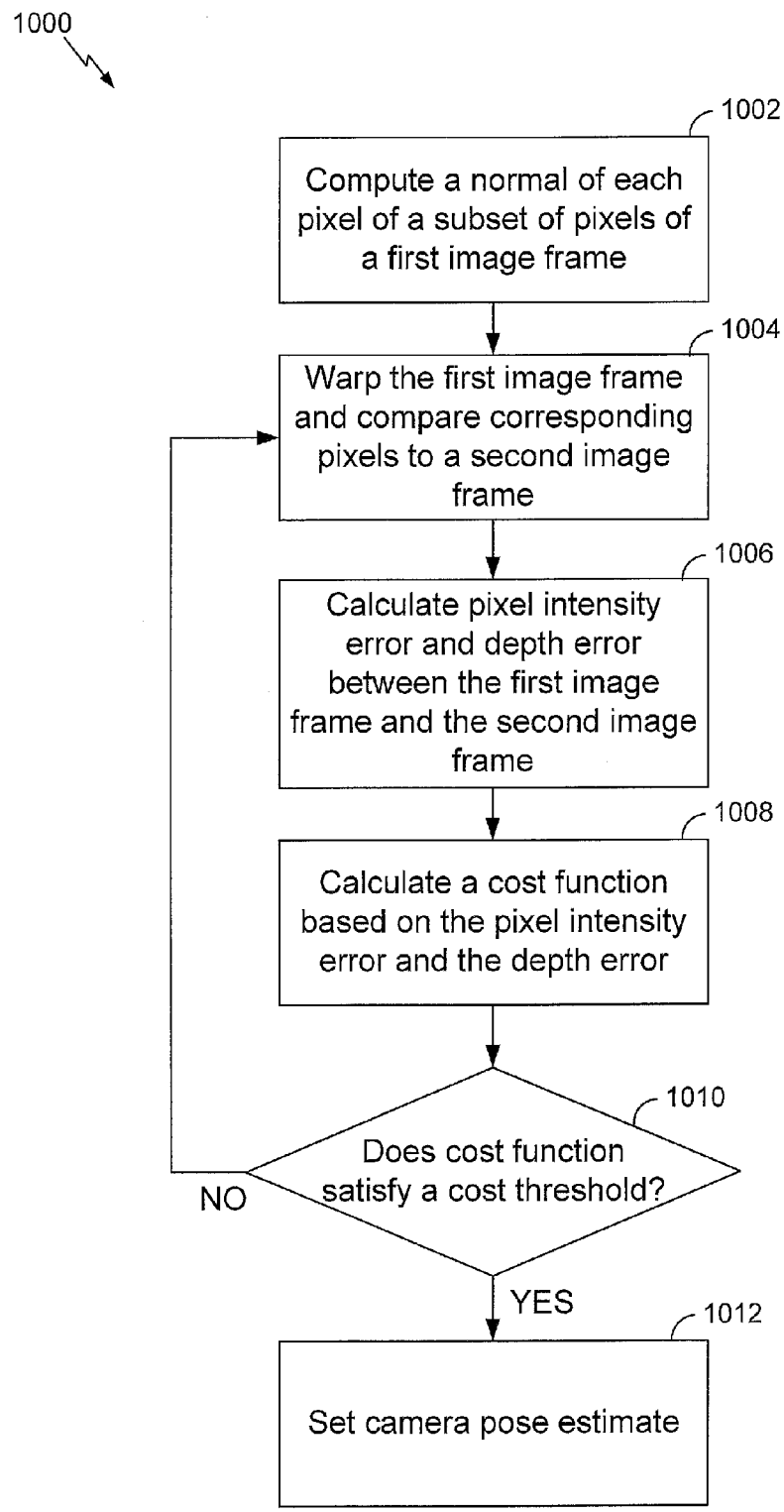
FIG. 10 is a flow diagram of a particular illustrative embodiment of a method of estimating camera poses of a particular image frame based on a cost function.

Referring to FIG. 10, a method 1000 for setting a camera pose estimate for a particular image frame is illustrated. In an illustrative embodiment, the method 1000 may be performed by the processor 106 of FIG. 1 or the processor 206 of FIG. 2.

The method 1000 includes computing a normal of each pixel of a subset of pixels of a first image frame, at 1002. The normal of each pixel is a vector that indicates a direction perpendicular to a tangential plane corresponding to each pixel. The subset of pixels may include a down-sampled or resized copy of the first image frame, such as a low resolution (e.g., QQVGA resolution) copy of the first image frame having a high resolution (e.g., HD). The method 1000 also includes warping the first image frame and comparing corresponding pixels of a resulting warped image frame to a second image frame (or keyframe), at 1004. For example, the first image frame may correspond to the "current" image 704 of FIG. 7, the second image frame may correspond to the reference image 702 of FIG. 7, and the warped image frame may correspond to the warped current image 706 of FIG. 7. The method 1000 further includes calculating pixel intensity error and depth error between a warped first image frame and the second image frame (or keyframe), at 1006. The pixel intensity error or the depth error may be depicted by the error image 708 of FIG. 7.

The method 1000 further includes calculating a cost function based on the pixel intensity error and the depth error, at 1008. The cost function may be represented by the equation described herein with respect to FIG. 7. The method 1000 further includes determining whether the result of the cost function satisfies a cost threshold, at 1010. If the result does not satisfy the cost threshold, the method 1000 returns to 1004 and the first image frame is warped again. If the result satisfies the cost threshold, the camera pose estimate is set, at 1012.

Figure 11:
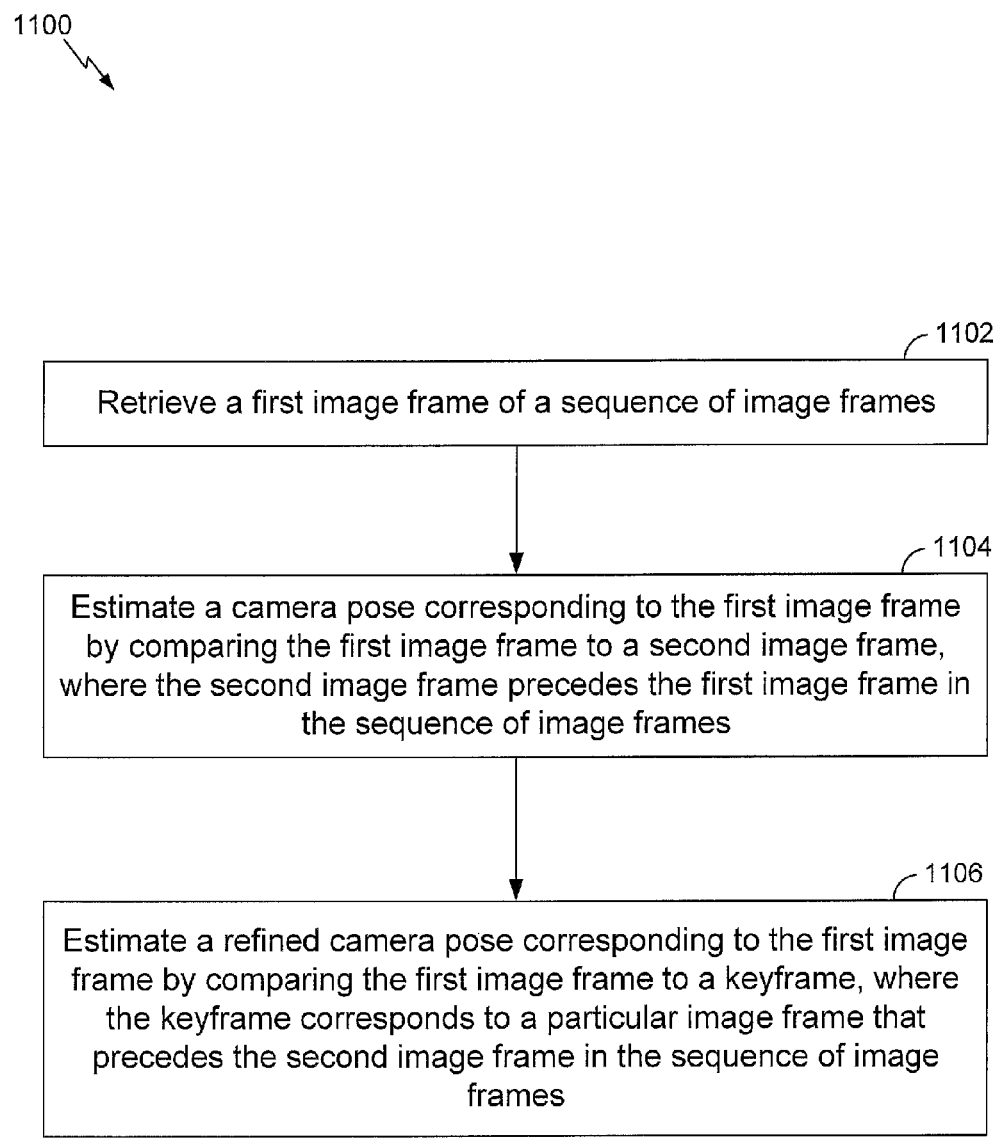
FIG. 11 is a flow diagram of a particular illustrative embodiment of a method of estimating a camera pose and estimating a refined camera pose.

Referring to FIG. 11, a method 1100 for estimating a camera pose and estimating a refined camera pose is illustrated. The method 1100 includes retrieving a first image frame of a sequence of image frames, at 1102. The sequence of image frames may be captured with an image capture device, such as the camera 102, the camera 202, or the image capture device 302. The method 1100 also includes estimating a camera pose corresponding to the first image frame by comparing the first image frame to a second image frame, at 1104, where the second image frame precedes the first image frame in the sequence of image frames. In one embodiment, estimating the camera pose may be performed by the one or more camera pose estimators 208 of FIG. 2, the first operating mode/processing thread of FIGS. 4-6, or any combination thereof. The method 1100 further includes estimating a refined camera pose corresponding to the first image frame by comparing the first image frame to a keyframe, at 1106. The keyframe may correspond to a particular image frame that precedes the second image frame in the sequence of image frames. In one embodiment, estimating the refined camera pose may be performed by the one or more camera pose estimators 208 of FIG. 2, the second operating mode/processing thread of FIGS. 4-6, or any combination thereof The method 800 of FIG. 8, the method 900 of FIG. 9, the method 1000 of FIG. 10, the method 1100 of FIG. 11, or a combination thereof, may be implemented by a field-programmable gate array (FPGA) device, an application-specific integrated circuit (ASIC), a processing unit such as a central processing unit (CPU), a digital signal processor (DSP), a controller, another hardware device, firmware device, or any combination thereof. As an example, one or more of the method 800 of FIG. 8, the method 900 of FIG. 9, the method 1000 of FIG. 10, and the method 1100 of FIG. 11 may be performed by a processor that executes instructions, as described with respect to FIG. 12.

Figure 12:
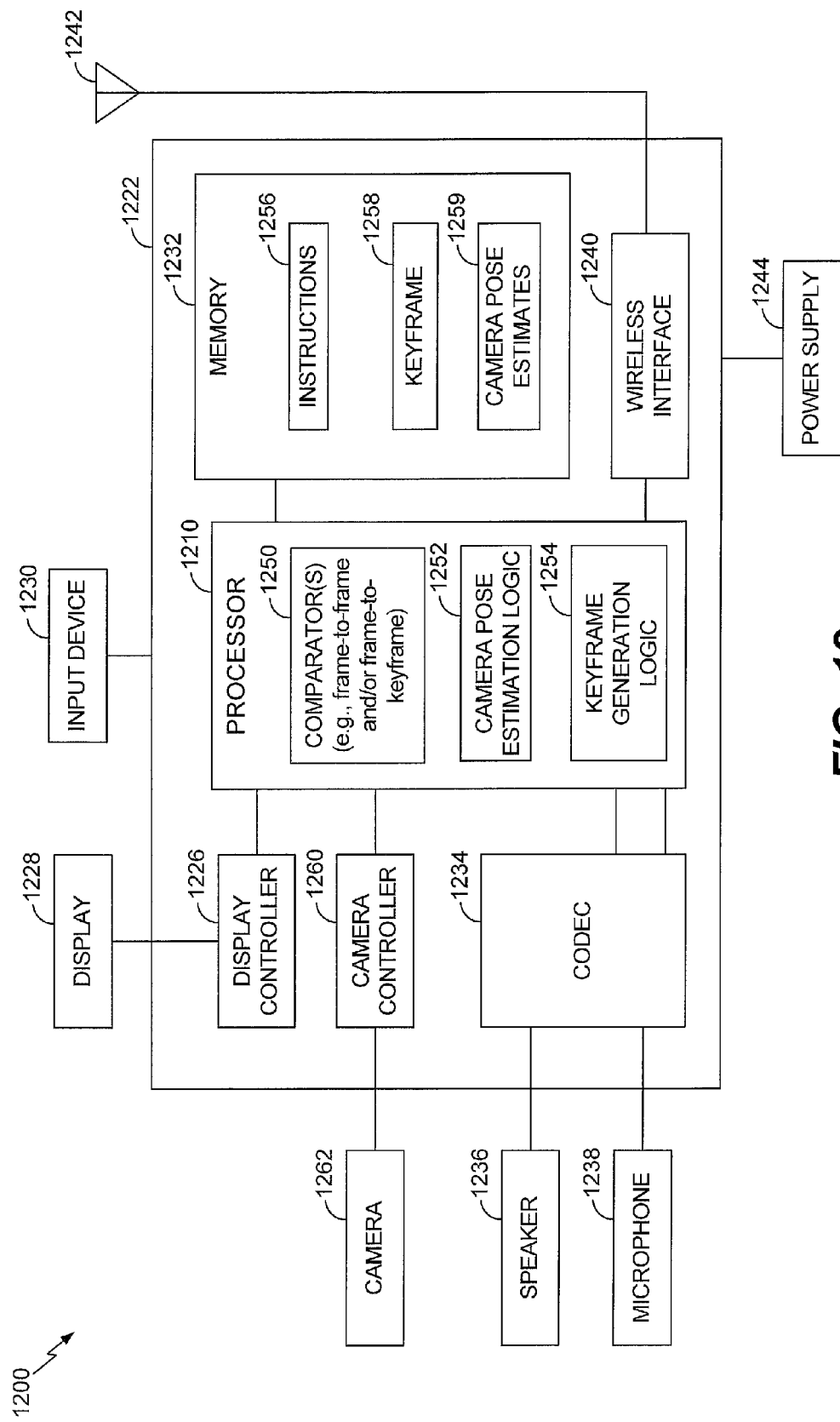
FIG. 12 is a block diagram of a computing device including a processor configured to perform camera pose estimation based on a sequence of image frames.

Referring to FIG. 12, a block diagram of a particular illustrative embodiment of an electronic device, such as a wireless communication device, is depicted and generally designated 1200. The device 1200 includes a processor, such as a digital signal processor (DSP) 1210, coupled to a memory 1232. The processor may include or correspond to the processor 106 of FIG. 1 or the processor 206 of FIG. 2. The memory may include or correspond to the memory 112 of FIG. 1 and/or the memory 212 of FIG. 2. A camera 1262 may be coupled to the processor 1210 via a camera controller 1260. In an illustrative embodiment, the camera 1262 corresponds to the camera 102 of FIG. 1, to the camera 202 of FIG. 2, or to the image capture device 302 of FIG. 3. One or more comparators 1250 may be implemented using one or more hardware devices within the processor 1210, software instructions executable by the processor 1210, or a combination thereof. In an illustrative embodiment, the one or more comparators 1250 may correspond to the comparator 108 of FIG. 1, may correspond to the one or more comparators 208 of FIG. 2, and/or may operate according to the methods of FIGS. 6-9. The one or more comparators 1250 may provide comparison results (e.g., an overlap ratio between a plurality of image frames) to be analyzed or processed by the processor 1210 using camera pose estimation logic 1252 and/or keyframe generation logic 1254.

The memory 1232 may be a non-transient or non-transitory computer readable medium storing computer-executable instructions 1256 to perform all or a portion of one or more operations described with reference to FIGS. 1-11. For example, the instructions 1256 may include instructions that, when executed by the processor 1210, cause the processor 1210 to receive a first image frame of a sequence of image frames, determine an overlap ratio between the first image frame and a keyframe, where the overlap ratio is based on a pixel-by-pixel comparison of first pixel values of the first image frame and second pixel values of the keyframe, compare the overlap ratio to an overlap ratio threshold, and generate a new keyframe using the first image frame based on the overlap ratio not satisfying a threshold. If the overlap ratio satisfies the threshold, no new keyframe may be generated. If a new keyframe is generated, the new keyframe may be stored to the memory 1232 as a keyframe 1258. Camera pose estimates generated by the camera pose estimation logic 1252 may be stored as camera pose estimates 1259.

In accordance with the disclosed embodiments, a computer-readable storage device, such as the memory 112 of FIG. 1, the memory 212 of FIG. 2, or the memory 1232 of FIG. 12, is disclosed. The computer-readable storage device includes instructions that, when executed by a processor, such as the processor 106 of FIG. 1, the processor 206 of FIG. 2, or the processor 1210 of FIG. 12, cause the processor to receive, from an image capture device, a first image frame of a sequence of image frames. The sequence of image frames may include or correspond to the sequence of image frames 104 of FIG. 1 or the sequence of image frames 204 of FIG. 2. The instructions also cause the processor to estimate a camera pose corresponding to the first image frame by comparing the first image frame to a second image frame, where the second image frame precedes the first image frame in the sequence of image frames. The camera pose may include or correspond to the camera pose estimate 250 of FIG. 2. The instructions further cause the processor to estimate a refined camera pose corresponding to the first image frame by comparing the first image frame to a keyframe, where the keyframe corresponds to a particular image frame that precedes the second image frame in the sequence of image frames. The refined camera pose may include or correspond to the refined camera pose estimate 256 of FIG. 2.

FIG. 12 also shows a display controller 1226 that is coupled to the digital signal processor 1210 and to a display 1228. A coder/decoder (CODEC) 1234 can also be coupled to the digital signal processor 1210. A speaker 1236 and a microphone 1238 can be coupled to the CODEC 1234.

FIG. 12 also indicates that a wireless interface 1240 can be coupled to the digital signal processor 1210 and to an antenna 1242. In a particular embodiment, the processor 1210, the display controller 1226, the camera controller 1260, the memory 1232, the CODEC 1234, and the wireless interface 1240 are included in a system-in-package or system-on-chip device 1222. In a particular embodiment, an input device 1230 and a power supply 1244 are coupled to the system-on-chip device 1222. Moreover, in a particular embodiment, as illustrated in FIG. 12, the display 1228, the input device 1230, the speaker 1236, the microphone 1238, the antenna 1242, the camera 1262, and the power supply 1244 are external to the system-on-chip device 1222. However, each of the display 1228, the input device 1230, the speaker 1236, the microphone 1238, the antenna 1242, the camera 1262, and the power supply 1244 can be coupled to a component of the system-on-chip device 1222, such as an interface or a controller.

In conjunction with the described embodiments, a system is disclosed that may include means for receiving a first image frame of a sequence of image frames. The means for receiving images may include the camera 102 of FIG. 1, the camera 202 of FIG. 2, the image capture device 302 of FIG. 3, the camera 1262 of FIG. 12, one or more other devices or circuits configured to receive the first image frame of the sequence of image frames, or any combination thereof. The system may also include means for generating a new keyframe. Generating the new keyframe includes determining an overlap ratio between the first image frame and a keyframe, where the overlap ratio is based on a pixel-by-pixel comparison of first pixel values of the first image frame and second pixel values of the keyframe, comparing the overlap ratio to an overlap ratio threshold, and generating a new keyframe using the first image frame based on the overlap ratio not satisfying the overlap ratio threshold. For example, the means for generating the new keyframe may include the processor 106 of FIG. 1, the keyframe generator 110 of FIG. 1, the processor 206 of FIG. 2, the keyframe generator 210 of FIG. 2, the processor 1210 of FIG. 12 (or component(s) thereof, such as the keyframe generation logic 1254), one or more other devices or circuits configured to determine an overlap ratio between the first image frame and the keyframe, or any combination thereof.

In conjunction with the described embodiments, an apparatus may include means for receiving, from an image capture device, a first image frame of a sequence of image frames. The means for receiving may include the comparator 108 of FIG. 1, the keyframe generator 110 of FIG. 1, the image frame buffer 207 of FIG. 2, the one or more camera pose estimators 208 of FIG. 2, the camera controller 1260 of FIG. 12, one or more other structures, devices, or circuits configured to receive an image frame of the sequence of image frames, or any combination thereof. The apparatus may also include means for estimating a camera pose corresponding to the first image frame based on a first comparison of the first image frame to a second image frame, where the second image frame precedes the first image frame in the sequence of image frames. The means for estimating the camera pose may include the one or more camera pose estimators 208 of FIG. 2, the camera pose estimation logic unit 1252 of FIG. 12, one or more other structures, devices, or circuits configured to estimate camera poses, or any combination thereof.

The apparatus may further include means for estimating a refined camera pose corresponding to the first image frame based on a second comparison of the first image frame to a keyframe, where the keyframe corresponds to a particular image frame that precedes the second image frame in the sequence of image frames. The means for estimating the refined camera pose may include the one or more camera pose estimators 208 of FIG. 2, the camera pose estimation logic unit 1252 of FIG. 12, one or more other structures, devices, or circuits configured to estimate camera poses, or any combination thereof.

Those of skill would further appreciate that the various illustrative logical blocks, configurations, modules, circuits, and algorithm steps described in connection with the embodiments disclosed herein may be implemented as electronic hardware, computer software executed by a processor, or combinations of both. Various illustrative components, blocks, configurations, modules, circuits, and steps have been described above generally in terms of their functionality. Whether such functionality is implemented as hardware or processor executable instructions depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the embodiments disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of non-transient storage medium known in the art. An exemplary storage medium is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description of the disclosed embodiments is provided to enable a person skilled in the art to make or use the disclosed embodiments. Various modifications to these embodiments will be readily apparent to those skilled in the art, and the principles defined herein may be applied to other embodiments without departing from the scope of the disclosure. Thus, the present disclosure is not intended to be limited to the embodiments shown herein but is to be accorded the widest scope possible consistent with the principles and novel features as defined by the following claims.

What is claimed is:

1. A method comprising:
   receiving, from an image capture device, a first image frame of a sequence of image frames;
   estimating, at a processor, a camera pose corresponding to the first image frame by comparing the first image frame to a second image frame, wherein the second image frame precedes the first image frame in the sequence of image frames;
   selecting a first keyframe from a plurality of keyframes associated with the sequence of image frames, wherein the first keyframe is selected based on similarity of the camera pose corresponding to the first image frame to a camera pose corresponding to each of the plurality of keyframes; and
   estimating, at the processor, a refined camera pose corresponding to the first image frame by comparing the first image frame to the first keyframe.

2. The method of claim 1, wherein the camera pose corresponding to the first image frame is estimated as part of a first processing thread of the processor, wherein the refined camera pose corresponding to the first image frame is estimated as part of a second processing thread of the processor.

3. The method of claim 2, wherein the processor is configured to execute processing threads in parallel, and wherein the first processing thread and the second processing thread are executed in parallel.

4. The method of claim 1, wherein estimating the camera pose corresponding to the first image frame comprises:
   generating a warped frame by transforming the first image frame based on an estimate of relative motion of the image capture device between capture of the first image frame and capture of the second image frame;
   determining a pixel intensity error, wherein the pixel intensity error indicates a difference of pixel intensity between one or more pixels of the warped frame and one or more pixels of the second image frame; and
   determining a depth error, wherein the depth error indicates a difference of depth between the one or more pixels of the warped frame and the one or more pixels of the second image frame, wherein the depth error is determined based on normal values of the one or more pixels of the second image frame, and wherein a normal value of each pixel includes a vector that indicates a direction perpendicular to a tangential plane of each pixel.

5. The method of claim 1, wherein estimating the refined camera pose corresponding to the first image frame comprises:
generating a warped frame by transforming the first image frame based on an estimate of relative motion of the image capture device between capture of the first image frame and capture of the first keyframe;
determining a pixel intensity error, wherein the pixel intensity error indicates a difference of pixel intensity between one or more pixels of the warped frame and one or more pixels of the first keyframe; and
determining a depth error, wherein the depth error indicates a difference of depth between the one or more pixels of the warped frame and the one or more pixels of the first keyframe, wherein the depth error is determined based on normal values of the one or more pixels of the first keyframe, and wherein a normal value of each pixel includes a vector that indicates a direction perpendicular to a tangential plane of each pixel.

6. The method of claim 1, further comprising:
determining, at the processor, an overlap ratio between the first image frame and the first keyframe, wherein the overlap ratio is based on a pixel-by-pixel comparison of first pixel values of the first image frame and second pixel values of the first keyframe;
comparing the overlap ratio to an overlap ratio threshold to generate a comparison result; and
generating a new keyframe using the first image frame based on the comparison result.

7. The method of claim 6, wherein generating the new keyframe comprises creating a copy image frame corresponding to the first image frame in memory, and wherein the copy image frame is designated as the new keyframe.

8. The method of claim 6, wherein the first pixel values include depth values, photometric values, or a combination thereof.

9. The method of claim 1, further comprising generating a three-dimensional point cloud using the refined camera pose and the sequence of image frames.

10. The method of claim 9, further comprising:
receiving, from the image capture device, one or more additional image frames of the sequence of image frames; and
updating the three-dimensional point cloud based on the one or more additional image frames, wherein a rate of updating the three-dimensional point cloud is substantially equal to a rate of receiving the one or more additional image frames.

11. The method of claim 1, wherein the camera pose corresponding to the first image frame indicates an approximation of a position of the image capture device at a particular time when the first image frame is captured, wherein the camera pose corresponding to the first image frame includes position coordinates in a 3D space and an orientation corresponding to the image capture device at a time when the first image frame is captured, and wherein the similarity of the camera pose corresponding to the first image frame to the camera pose of the first keyframe is based on at least one of:
a difference between a relative angle of the camera pose corresponding to the first image frame and a relative angle of the camera pose of the first keyframe;
a relative distance threshold for the first image frame; and
a relative position threshold for the first image frame.

12. The method of claim 1, wherein the first image frame has a first resolution, wherein the keyframe has a keyframe resolution, and wherein the first resolution is different from the keyframe resolution.

13. An apparatus comprising
a processor; and
a memory storing instruction that are executable by the processor to cause the processor to:
receive, from an image capture device, a first image frame of a sequence of image frames;
estimate a camera pose corresponding to the first image frame based on a first comparison of the first image frame to a second image frame, wherein the second image frame precedes the first image frame in the sequence of image frames;
select a first keyframe from a plurality of keyframes associated with the sequence of image frames, wherein the first keyframe is selected based on similarity of the camera pose corresponding to the first image frame to a camera pose corresponding to each keyframe of the plurality of keyframes; and
estimate a refined camera pose corresponding to the first image frame based on a second comparison of the first image frame to the first keyframe.

14. The apparatus of claim 13, wherein the camera pose corresponding to the first image frame is estimated as part of a first processing thread of the processor, wherein the refined camera pose corresponding to the first image frame is estimated as part of a second processing thread of the processor, and wherein the similarity of the camera pose corresponding to the first image frame to the camera pose corresponding to the first keyframe satisfies a relative distance threshold for the first image frame.

15. The apparatus of claim 14, wherein the similarity of the camera pose corresponding to the first image frame to the camera pose corresponding to the first keyframe satisfies a relative position threshold for the first image frame.

16. The apparatus of claim 13, wherein the instructions are further executable to cause the processor to transform the first image frame to generate a warped frame, wherein the first image frame is transformed based on an estimate of relative motion between the image capture device and position coordinates in a 3D space corresponding to the second image frame, and wherein the similarity of the camera pose corresponding to the first image frame to the camera pose corresponding to the first keyframe is based on:
a difference between position coordinates of the camera pose corresponding to the first image frame and position coordinates corresponding to the camera pose corresponding to the first keyframe.

17. The apparatus of claim 16, wherein the instructions are further executable to cause the processor to determine a pixel intensity error, wherein the pixel intensity error indicates a difference of pixel intensity between one or more pixels of the warped frame and one or more pixels of the second image frame.

18. The apparatus of claim 16, wherein the instructions are further executable to cause the processor to determine a depth error, wherein the depth error indicates a difference of depth between one or more pixels of the warped frame and one or more pixels of the second image frame, wherein the depth error is determined based on normal values of the one or more pixels of the second image frame, and wherein a normal value of each pixel includes a vector that indicates a direction perpendicular to a tangential plane of each pixel.

19. The apparatus of claim 13, wherein the instructions are further executable to cause the processor to determine an overlap ratio between the first image frame and the first keyframe, and wherein the similarity of the camera pose corresponding to the first image frame to the camera pose of the first keyframe satisfies a relative angle threshold for the first image frame.

20. The apparatus of claim 19, wherein the overlap ratio is based on a pixel-by-pixel comparison of first pixel values of the first image frame and second pixel values of the first keyframe.

21. The apparatus of claim 19, wherein the instructions are further executable to cause the processor to generate a result based on a comparison of the overlap ratio to an overlap ratio threshold.

22. The apparatus of claim 21, wherein the instructions are further executable to cause the processor to generate a new keyframe using the first image frame based on the result indicating that the first image frame is not similar to the first keyframe.

23. A non-transitory computer-readable storage device storing instructions that, when executed by a processor, cause the processor to:
  receive, from an image capture device, a first image frame of a sequence of image frame;
  estimate a camera pose corresponding to the first image frame based on a first comparison of the first image frame to a second image frame, wherein the second image frame precedes the first image frame in the sequence of image frames;
  select a first keyframe from a plurality of keyframes associated with the sequence of image frames, wherein the first keyframe is selected based on similarity of the camera pose corresponding to the first image frame to a camera pose corresponding to each keyframe of the plurality of keyframes; and
  estimate a refined camera pose corresponding to the first image frame based on a second comparison of the first image frame to the first keyframe.

24. The non-transitory computer-readable storage device of claim 23, wherein the camera pose corresponding to the first image frame is estimated as part of a first processing thread of the processor, wherein the refined camera pose corresponding to the first image frame is estimated as part of a second processing thread of the processor, wherein the first processing thread and the second processing thread are executed in parallel, and wherein the similarity of the camera pose corresponding to the first image frame to the camera pose corresponding to the first keyframe satisfies a relative position threshold for the first image frame.

25. The non-transitory computer-readable storage device of claim 23, wherein the instructions, when executed by the processor, further cause the processor to generate a three-dimensional point cloud based on the sequence of image frames, wherein a rate of generating the three-dimensional point cloud is substantially equal to a rate of receiving the sequence of image frames.

26. An apparatus comprising:
  means for receiving, from an image capture device, a first image frame of a sequence of image frames;
  means for estimating a camera pose corresponding to the first image frame based on a first comparison of the first image frame to a second image frame, wherein the second image frame precedes the first image frame in the sequence of image frames;
  means for selecting a first keyframe from a plurality of keyframes associated with the sequence of image frames, wherein the first keyframe is selected based on similarity of the camera pose corresponding to the first image frame to a camera pose corresponding to each keyframe of the plurality of keyframes; and
  means for estimating a refined camera pose corresponding to the first image frame based on a second comparison of the first image frame to the first keyframe.

27. The apparatus of claim 26, further comprising:
  means for performing the first comparison of the first image frame to the second image frame; and
  means for performing the second comparison of the first image frame to the first keyframe.

28. The apparatus of claim 26, wherein the similarity of the camera pose of the first image frame to the camera pose of the first keyframe satisfies a relative position threshold for the first image frame.

29. The apparatus of claim 26, further comprising means for generating a new keyframe based on the first image frame.

30. The apparatus of claim 26, further comprising means for generating a three-dimensional point cloud using the refined camera pose and the sequence of image frames.

* * * * *